US011625751B2

(12) United States Patent
Longo et al.

(10) Patent No.: US 11,625,751 B2
(45) Date of Patent: Apr. 11, 2023

(54) MESSAGE-TRANSMITTAL STRATEGY OPTIMIZATION

(71) Applicant: Twilio Inc., San Francisco, CA (US)

(72) Inventors: Claire Electra Longo, Denver, CO (US); Brendon Kyle Villalobos, San Francisco, CA (US); Liyuan Zhang, San Mateo, CA (US); Jorge Chang, Sunnyvale, CA (US); Elizabeth Yee, San Francisco, CA (US); Abhishek Bambha, Burlingame, CA (US)

(73) Assignee: Twilio Inc., San Francisco, CA (US)

( * ) Notice: Subject to any disclaimer, the term of this patent is extended or adjusted under 35 U.S.C. 154(b) by 71 days.

(21) Appl. No.: 16/999,810

(22) Filed: Aug. 21, 2020

(65) Prior Publication Data
US 2021/0374801 A1 Dec. 2, 2021

Related U.S. Application Data

(60) Provisional application No. 63/029,972, filed on May 26, 2020.

(51) Int. Cl.
*G06Q 30/02* (2012.01)
*G06Q 30/0251* (2023.01)
(Continued)

(52) U.S. Cl.
CPC ..... *G06Q 30/0254* (2013.01); *G06F 16/2379* (2019.01); *G06N 20/00* (2019.01);
(Continued)

(58) Field of Classification Search
CPC ............... G06Q 30/02; G06Q 30/0254; G06Q 30/0255; G06Q 30/0264; G06Q 30/0267;
(Continued)

(56) References Cited

U.S. PATENT DOCUMENTS 10,715,473 B2 * 7/2020 Duale ................... H04L 51/226
10,931,620 B2 * 2/2021 Andrianakou ..... G06Q 30/0241
(Continued)

FOREIGN PATENT DOCUMENTS

CN 108141882 A * 6/2018 ............ H04W 74/08
EP 1367786 A1 * 12/2003 ............. H04L 12/58
EP 1624621 A1 * 12/2003 ............. H04L 12/40

OTHER PUBLICATIONS

Nachoua Guizani; Jocelyne Fayn, Framework for Intelligent Message Routing Policy Adaptation (English), 2015 IEEE International Conference on Autonomic Computing 9page9s); 235-238), Jul. 1, 2015 (Year: 2015).*

(Continued)

*Primary Examiner* — Marilyn G Macasiano
(74) *Attorney, Agent, or Firm* — Schwegman Lundberg & Woessner, P.A.

(57) ABSTRACT

Methods, systems, and computer programs are presented for the determination of optimal communication scheduling. Send Time Optimization (STO) uses machine learning (ML) to recommend a personalized send time based on a recipient's past engagement patterns. The purpose of the ML model is to learn patterns in the data automatically and use the patterns to make personalized predictions for each recipient. The send time recommended by the model is the time at which the model believes the recipient will be most likely to engage with the message, such as clicking or opening, and use of the send time mode is expected to increase engagement from recipients. Additional customizations include communication-frequency optimization, communication-channel selection, and engagement-scoring model.

20 Claims, 16 Drawing Sheets

(51) Int. Cl.
*G06N 20/00* (2019.01)
*G06F 16/23* (2019.01)
*G06Q 30/0241* (2023.01)

(52) U.S. Cl.
CPC ..... *G06Q 30/0255* (2013.01); *G06Q 30/0264* (2013.01); *G06Q 30/0267* (2013.01); *G06Q 30/0277* (2013.01)

(58) Field of Classification Search
CPC ............. G06Q 30/0277; G06Q 10/067; G06Q 30/0246; G06Q 30/0207; G06F 16/2379; G06F 16/285; G06N 20/00
See application file for complete search history.

(56) References Cited

U.S. PATENT DOCUMENTS

| | | | |
|---|---|---|---|
| 11,200,581 B2* | 12/2021 | Williams | G06V 10/762 |
| 11,341,414 B2* | 5/2022 | Rausch | G06F 16/24568 |
| 11,438,289 B2* | 9/2022 | Evans | H04L 51/212 |
| 2007/0249410 A1 | 10/2007 | Patel et al. | |
| 2008/0162384 A1 | 7/2008 | Kleist et al. | |
| 2009/0172079 A1 | 7/2009 | Eggleston et al. | |
| 2010/0145900 A1 | 6/2010 | Zheng et al. | |
| 2010/0211641 A1 | 8/2010 | Yih et al. | |
| 2011/0302169 A1 | 12/2011 | Brdiczka et al. | |
| 2012/0303558 A1 | 11/2012 | Jaiswal | |
| 2015/0347924 A1 | 12/2015 | Zeng et al. | |
| 2015/0381533 A1 | 12/2015 | Klemm et al. | |
| 2015/0381552 A1* | 12/2015 | Vijay | H04L 67/306 709/206 |
| 2016/0132934 A1* | 5/2016 | Hartlaub | G06Q 30/0269 705/14.64 |
| 2021/0126885 A1* | 4/2021 | Zhang | H04L 51/226 |
| 2021/0184999 A1* | 6/2021 | Klink | H04L 51/216 |
| 2021/0374802 A1 | 12/2021 | Longo et al. | |

OTHER PUBLICATIONS

T. O'Donovan; J. Benson; U. Roedig; C.J. Sreenan, Priority interrupts of Duty Cycled communications in wireless sensor networks 9English), 2008 33rd IEEE Conference Networks (LCN) (pp. 732-739), Oct. 1, 2008 (Year: 2008).*
U.S. Appl. No. 16/999,848, filed Aug. 21, 2020, Message-Transmittal Strategy Optimization.
"U.S. Appl. No. 16/999,848, Non Final Office Action dated Jul. 21, 2021", 20 pgs.
"U.S. Appl. No. 16/999,848, Response filed Oct. 21, 2021 to Non Final Office Action dated Jul. 21, 2021", 17 pages.
"U.S. Appl. No. 16/999,848, Final Office Action dated Dec. 29, 2021", 23 pgs.
"U.S. Appl. No. 16/999,848, Non Final Office Action dated May 9, 2022", 23 pgs.
"U.S. Appl. No. 16/999,848, Response filed Mar. 29, 2022 to Final Office Action dated Dec. 29, 2021", 12 pgs.
"U.S. Appl. No. 16/999,848, Examiner Interview Summary dated Jul. 28, 2022", 3 pgs.
"U.S. Appl. No. 16/999,848, Response filed Aug. 8, 2022 to Non Final Office Action dated May 9, 2022", 14 pgs.
"U.S. Appl. No. 16/999,848, Final Office Action dated Oct. 31, 2022", 22 pgs.
"U.S. Appl. No. 16/999,848, Response filed Dec. 22, 22 to Final Office Action dated Oct. 31, 2022", 13 pgs.

* cited by examiner

MESSAGE-TRANSMITTAL STRATEGY OPTIMIZATION

PRIORITY APPLICATION

This application claims priority to U.S. Provisional Application Ser. No. 63/029,972, filed May 26, 2020, the disclosure of which is incorporated herein in its entirety by reference.

TECHNICAL FIELD

The subject matter disclosed herein generally relates to methods, systems, and machine-readable storage media for optimizing communication transmittals.

BACKGROUND

In today's world, businesses utilize a variety of different devices and channels to reach their customers, and successful businesses must be prepared to engage these customers with a coordinated, timely, and consistent message across each of these devices and channels.

Often, marketers have to work with multiple tools and spreadsheets in order to attempt to reconcile data about who their customers are so that they can communicate effectively with them. Companies want to communicate with clients to maintain a positive relationship, but companies do not want to overwhelm clients with too many messages because the reaction may be negative. However, customers are different and have different interests but the marketers do not have the right tools to set effective communication strategies.

This problem intensifies given the ever-increasing amount of data available that needs to be processed for decision making. This includes customer data (information about the customer), marketing data (data about the success and failure of marketing activities), transaction data (transactions the customer has with the business), and event data (actions the customer takes with the business). A further complexity lays in the fact that marketing channels are constantly evolving, and marketers need to be equipped to deploy messages on new and potentially more effective channels.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
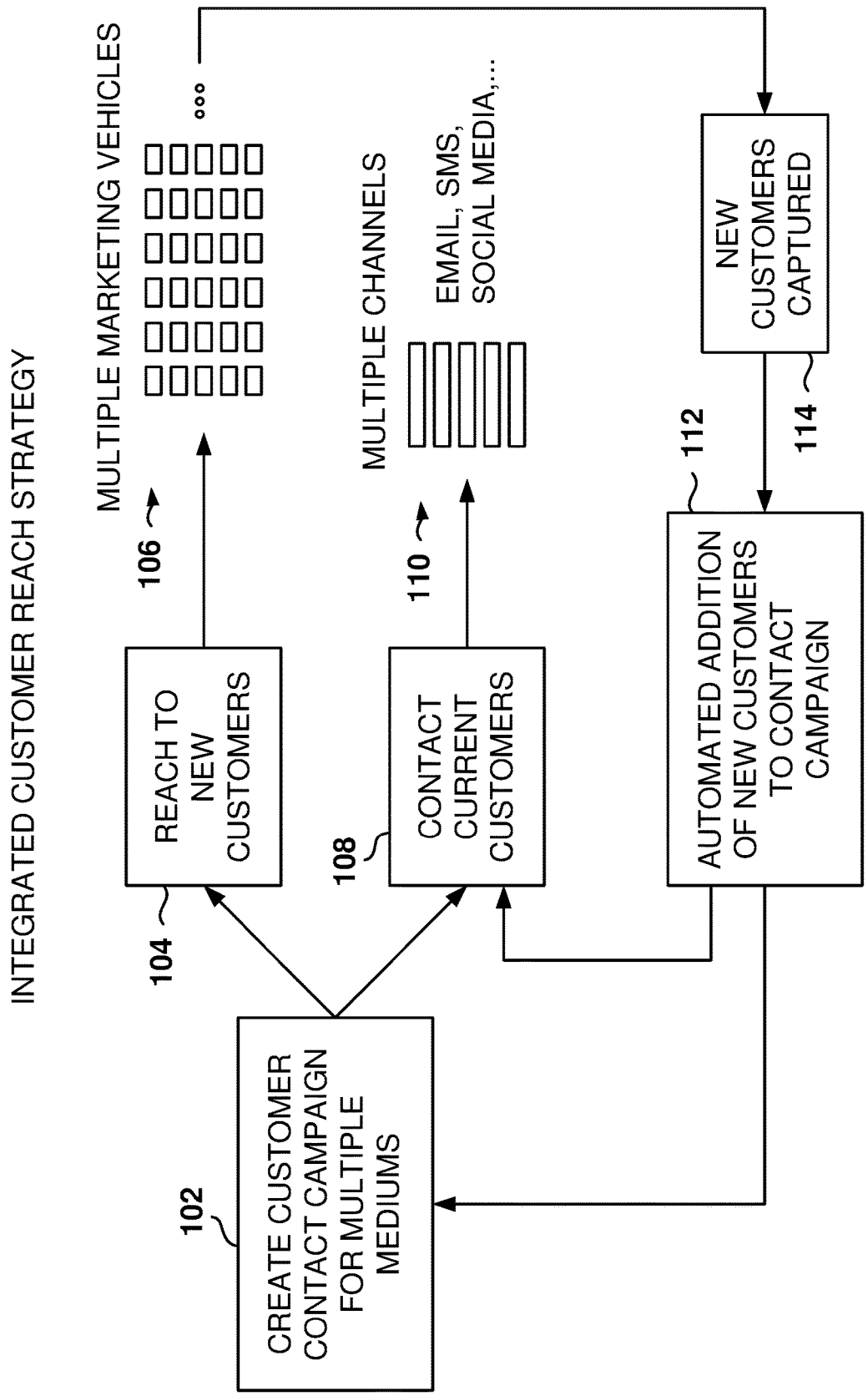
FIG. 1 illustrates an integrated customer-reach strategy for multiple channels and multiple marketing vehicles, according to some example embodiments.

Example methods, systems, and computer programs are directed to the determination of optimal communication scheduling. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Send-Time Optimization (STO) uses machine learning (ML) to recommend a personalized send time based on a recipient's past engagement patterns. The purpose of the STO model is to learn patterns in the data automatically and use the patterns to make personalized predictions for each recipient. The send time recommended by the STO model is the time at which the model determines the recipient will be most likely to engage with the message, such as clicking or opening, and use of the send-time model is expected to increase engagement from recipients. Additional customizations include communication-frequency optimization, communication-channel selection, and engagement-scoring model.

Some of the factors that influence whether a recipient engages with a message include the times when messages from a company are sent to a recipient, the frequency at which the recipient has been receiving the messages, the channel on which the messages are sent, and the content of the messages. In one aspect, optimization for each of these factors is performed by separate ML model generated for each factor: send-time optimization ML model, frequency optimization ML model, channel optimization ML model, and engagement scoring ML model. The four ML models are designed to work independently or two or more of the ML models may be designed to work together to orchestrate message delivery (e.g., a first model determines the best time of the day and a second model determines how many messages to send during a week).

The communications platform, referred to herein as an Intelligence Platform, includes an engagement Application Programming Interface (API) that enables developers to programmatically send a number of messages to each recipient through preferred channels, at determined optimal time and with determined optimal cadence. The communications platform further includes a message traffic Control system that enables message senders to automatically and optimally orchestrate messages through a versatile queueing system.

One general aspect includes a method that includes an operation for training a machine-learning program to generate a send-time model that determines a time for sending communications to users. The training utilizes training data defined by features related to user information and responses of users to previous communications to the users. Further, the method includes operations for receiving a communication request to send a communication to a first user, and for determining, by the send-time model and based on information about the first user, a time for sending the communication to the first user. The method further includes sending the communication to the first user at the determined time.

Another general aspect includes a method that includes an operation for training a machine-learning program to generate a frequency model that determines a frequency for sending communications to users. The training utilizes training data defined by features related to user information and responses of users to previous communications to the users. The method further includes determining, by the frequency model and based on information about a first user, a first frequency for the first user. The first frequency identifies the number of communications to transmit to the first user per period of time. Further, the method includes operations for receiving a communication request to send one or more communications to the first user and determining send times for the one or more communications to the first user based on the first frequency. The communications are sent at the determined send times.

FIG. 1 illustrates an integrated customer-reach strategy for multiple channels and multiple marketing vehicles, according to some example embodiments. Digital marketing may include "shotgun" or "spray and pray" approaches, where marketers simply buy impressions without knowing the specific user reached. Digital marketing may also include retargeting, where marketers can reach previous visitors using cookie retargeting, which may still be largely identity-less. Digital marketing may also include people-based marketing (e.g., using an email address as the customer identifier), which may offer marketers the chance to target specific customers directly and build powerful new audiences based on the profiles of their best customers. Further, social advertising (e.g., Facebook, Instagram, Twitter, LinkedIn, etc.) may be more popular with digital marketers than display advertising (e.g., Google Display Ads).

The marketer can configure advertisements to run between specific calendar dates or automatically when users "qualify" for a specific segment (e.g., visited a pricing page but did not purchase). Further, when a marketer creates an audience segment, an integrated communication system (ICS) keeps that segment up to date by automatically adding and removing people based on constantly evolving data from email, website, and dynamic events (e.g., new purchases). Marketers no longer have to transfer comma-separated-value (CSV) files to manage their audiences to handle multiple media. Instead, marketers rely on ICS to sync their audience in real time. As a result, marketers can now be confident that the people who see their ads are the ones that match the target audience. This solution saves marketers time and money by replacing a manual task and ensuring that the marketers do not spend money retargeting people who have left their target audience.

At operation 102, a user interface is provided to the marketer for creating a customer-contact campaign to expand across multiple media, such as email, advertisements, Short Message Service (SMS), phone, WhatsApp®, etc. Further, at operation 104, multiple marketing vehicles 106 are used to reach the new customers. Further, at operation 108, multiple channels 110 are used for sending communications to current customers in the email campaign (EC) customer list.

The multiple marketing vehicles 106 generate the capture of new customers (or potential new customers) 114. At operation 112, the ICS automatically adds new customers to the contact campaign, triggering the operation 108 for contacting the customers in the customer list of the campaign.

The integrated customer-reach strategy (e.g., combining web data with email list and activity data) enables marketers to create targeted prospecting and retargeting communication campaigns.

With ICS, the marketer is able to create a seamless marketing strategy that encompasses needs across email, display, social advertising, and so forth. ICS provides a simplified editor for creating content for multiple networks, and marketers can create and manage advertisements on Facebook, Instagram, and Google Display Ads in one session and in one place. Similarly, aggregated reporting saves the marketer time by providing the data needed to make changes to the marketing strategy. The time-savings resonates with marketers who often spend hours each week gathering and analyzing data. ICS does the legwork, which provides the marketers with more time to think and strategize about their business.

Figure 2:
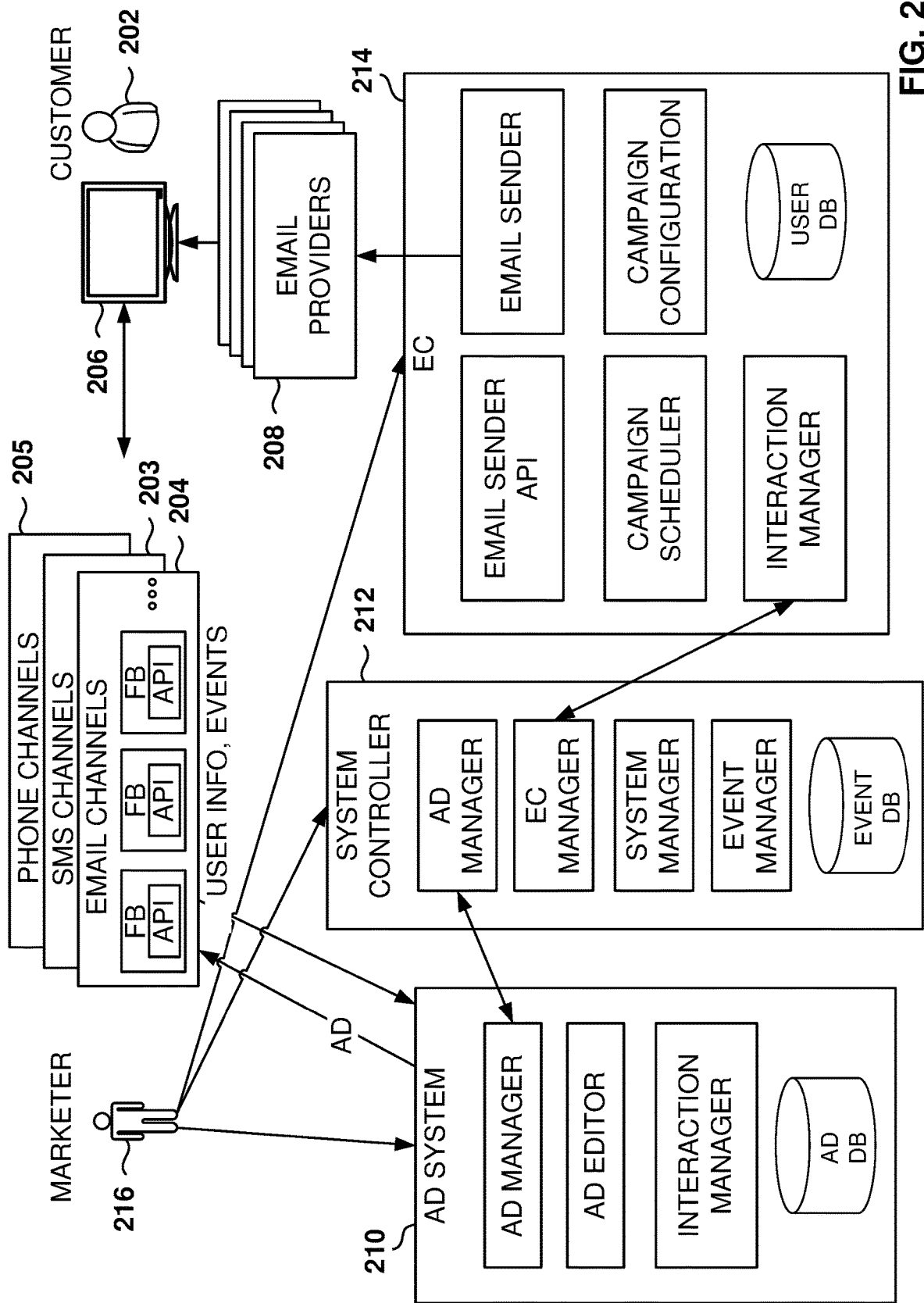
FIG. 2 is a sample system architecture for integrated campaigns, according to some example embodiments.

FIG. 2 is a sample system architecture for ICS, according to some example embodiments. ICS includes an ad system 210, system controller 212, and EC 214. Although the ICS architecture is presented for the ad and email systems, the ICS architecture is configurable to include other systems, such as SMS communications, phone communications, Snapchat, and the like. Additionally, some of the components may be grouped into a single component or located in a different subsystem. For example, the ad system 210 interfaces directly with the EC system 214. Thus, the embodiments illustrated in FIG. 2 should not be interpreted to be exclusive or limiting, but rather illustrative.

The ad system 210 includes an ad manager, an ad editor, an interaction manager, and an ad database. The ad manager coordinates the activities of the ad system 210, such as providing a user interface for configuring an ad campaign. The ad editor is a tool for creating ads to be placed on different media. In some example embodiments, the ad editor provides an option for creating a single ad, which is then customized for different media, such as Facebook, Instagram, or Google Ads; that is, a custom ad is generated for each channel based on the single ad. The ad database is used for storing the ads. Further, the interaction manager interfaces with the system controller 212 or other subsystems to exchange information. For example, when the interaction manager receives information for a new customer that has responded to one ad, the interaction manager passes the new customer information to the system controller 212.

The ad system 210 interfaces with the corresponding communications channels 203-205, such as email channels 204 (e.g., Facebook, Instagram, Google Ads), SMS channels 203, phone channels 205, and so forth. The corresponding APIs may be used to exchange communications, such as the business process manager (BPM) API for Facebook and Instagram.

When generating an ad campaign, the marketer 216 selects an ad template (or creates an ad from scratch) and configures ad parameters, such as how long the ad will run, what channel or channels will be used for the ad, what types of customers 202 to select for the ad, and the like. The system controller 212 includes an ad manager, an EC manager, an assistant manager, an event manager, and an event database.

The ad manager interfaces with the ad manager of the ad system 210, and the EC manager interfaces with the interaction manager of the EC system 214. The system manager controls the system controller and coordinates the interactions between different modules. The system manager is used for providing a user interface to configure the system controller 212, which includes configuring interactions between the different modules. Further, the user interface may be used to add or delete modules from the ICS.

The event manager is used for managing events that are stored in the event database. The events are collected by the ICS from multiple sources and relate to the interactions of customers 202 with the ICS or other online services. The EC system 214 includes an email sender API, an email sender, a campaign scheduler, a campaign configuration, an interaction manager, and a user database.

The email sender API provides an interface for other subsystems to send emails or schedule emails for transmission. The email sender interfaces with the different email providers 208 for sending email communications to customers 202. The email sender includes an email scheduler for processing outgoing emails.

The campaign configuration module provides a user interface for creating, configuring, modifying, and deleting campaigns. The campaign scheduler determines when to send the emails via the email sender. The interaction manager of the EC system 214 interacts with the EC manager in system controller 212 for coordinating activities and exchanging information. The user database includes information about the customers 202, such as name and email address. Additional information about users may be stored with the consent of the users, such as gender, age, address, preferences, and so forth. It is noted that some of the modules of the ICS provide APIs for interfacing with other modules.

When a customer 202 responds to an ad (shown on display 206), the corresponding ad channel obtains the customer 202's information (e.g., first name, last name, and email address) and forwards the information to the ad system 210. Additionally, the communications channels 204 may communicate other types of events captured for the customer 202, such as clicking on an ad, liking an ad or some other communication, and so forth.

Figure 3:
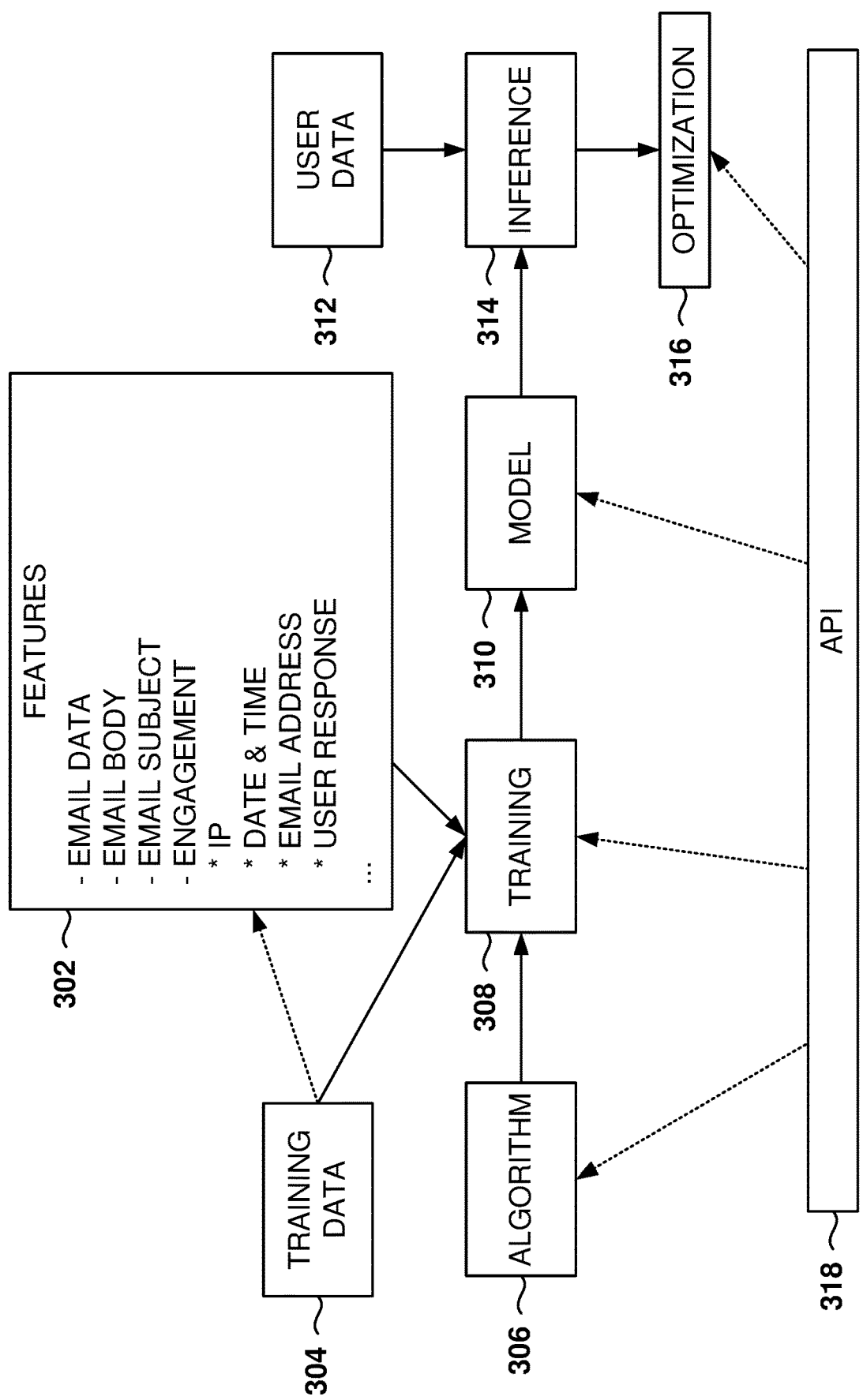
FIG. 3 illustrates an architecture for optimizing data communications, according to some example embodiments.

FIG. 3 illustrates the architecture for optimizing data communications, according to some example embodiments. First, here are a few definitions of terms utilized in the architecture for optimizing data communications.

A feature is an individual property of the model that is used for making inferences.
  A machine learning model, or simply referred to as a model, is a mathematical representation of a real-world process that is used to generate inferences (e.g., predictions, scores, classifications).
  Training data is a dataset used as input to a training algorithm that generates the model (e.g., historical engagement data from email messages).
  Training is a computational process to generate the model by discovering patterns in the training data.
  Training metadata is data containing metrics about the training, such as the training algorithm, the quality of the model, when the model was trained, the training set used for training, and so forth.
  Inference is the output of the model. Inferences can be of several types, such as predictions, classifications, scores, and so forth.
  Optimization API is an API to access a model, e.g., send-time optimization API for the email channel.

In some example embodiments, a communications service provider provides communications channels to customers for reaching out to their clients. The communications service provider provides an Intelligence Platform that leverages a vast amount of data from the service-delivery processes to create intelligence-based products for managing communications, such as intelligence to drive better outcomes by improving communications delivery. The better outcomes include any combination of increased customer engagement with the communications, increased customer satisfaction (e.g., the company sending the communications), increased recipient satisfaction with the service and the service's customers, decreased number of unsubscribe requests by recipients, increased revenue for the communications service, etc. The better outcomes may be predicted or derived from data items corresponding to data output from an application of a trained model to a particular data set and may be tracked by or stored in a database of the Intelligence Platform for subsequent analysis.

The IP offers several services, including send-time optimization, frequency optimization, channel optimization, and engagement scoring. In some example embodiments, these services are accessed through one or more APIs 318 for remote access. In some example embodiments, the APIs are used by customers for testing and development of the communication optimization features.

At a high level, the ML models 310 process historical engagement data from previous communications to discover patterns between variables and outcomes that can then be used to make insightful predictions that result in positive outcomes.

The features used for training 308 include one or more of email data, body of email, subject of the email, user engagement in response to an email, such as Internet Protocol address of the recipient, data and time of the email and the engagement, email address associated with the engagement, user response (e.g., click a link, delete email, unsubscribe from future communications), and the like. Although the features are described with reference to email communications, the same features are also available from other types of communications, such as SMS communications.

Further, communications may be promotional (e.g., to send promotional information) or transactional (to perform a transaction such as a purchase). In some example embodiments, one or both types of communications may be utilized for the training data 304. In some example embodiments, an ML model 310 is generated to classify communications into promotional or transactional.

In some example embodiments, the training data 304 is processed in order to protect user privacy, such as by embedding the data (e.g., encoding in a vector) in an irreversible way or omitting personal information from the communications (e.g., deleting user names and other identifying parameters from email data).

An ML algorithm 306 is used during training 308 to generate the model 310. Some examples of ML algorithms include Logistic Regression (LR), Naive-Bayes, Random Forest (RF), neural networks (NN), deep neural networks (DNN), matrix factorization, and Support Vector Machines (SVM), but other ML algorithms may also be used.

The training 308 saves the model metadata to storage. In some example embodiments, the training 308 is implemented using AWS Batch, which provides the flexibility to run longer training jobs, while also optimizing compute instance usage to the large amount of work to be done. In some example embodiments, training scripts are implemented in Python and Dockerized for execution with Batch.

The model 310 is used to make inferences 314, which take as input values of user data 312 associated with one or more of features 302. For example, the model 310 may be used to predict the best time to send a communication to a user using the user's profile data and history, and the best time may be specified as the time window for sending the communication. In some example embodiments, the user history may include a plurality of records with communications sent to the user and the response of the user: 1) email sent at 201910060600 from CompA.com, not opened; 2) email sent at 201910070630 from CompB.com, read; 3) email sent at 201910070635 from CompC.com, read and linked in email clicked; and so forth.

The time window to send the communication indicates the best time or times for sending the communication. The time window may include a specific time (e.g., Tuesday at 5:15 AM), or a range of possible times to send the communication (e.g., Thursday between 4:00 AM and 5:30 AM). The range of possible times may include non-continuous sub-ranges, such as in different days of the week (e.g., Thursday or Friday between 4:00 AM and 5:30 AM). Further, the result may indicate if the communication is to be sent one time or multiple times (e.g., Tuesday and Thursday before noon).

In some example embodiments, the system decides when to send the message based on the inference from the model. For example, the send-time model for email communications may generate a suggestion and the system will determine when to send the email based on the suggestion and the state of the queueing system for transmitting emails. For example, if the email system is very busy, the priority of the email communication may be lower at the beginning of the range recommendation, and the priority is increased towards the end of the transmission range in order to meet the recommended time window. Via a configuration utility, the user may enable or disable the automatic sending of communications without requiring user validation of the recommendations. When enabled, the system will select the best time to send the communication. When disabled, the system will propose dates and times for sending communications and the user will validate or modify the suggestions as desired.

In some example embodiments, to facilitate automation of message delivery optimization using an internet protocol tool referred to as Message Traffic Control (MTC), the ML modeling approach for send-time optimization supports the use of send-time recommendations with and without the other delivery optimization models: frequency, channel, and sequencing in the MTC Equation. This allows customers to seamlessly integrate the delivery optimization models with their infrastructure and select the use of models as desired while still modeling the dependencies between features.

This flexibility is accomplished by modeling dependencies between the variables being optimized, send time, channel, and frequency, and the external variables such as message and recipient attributes in a probabilistic framework.

A probability of engagement p(engage) is calculated using the components that affect optimal message engagement: send time, channel, frequency, recipient attributes, and message attributes. In some example embodiments, the p(engage) score is defined as:

$$p(engage|s,c,f,X_r,X_m) \qquad (1)$$

In equation (1), s is the send time, c is the channel (e.g., email, SMS, Instagram), f is the seven-day message frequency, $X_r$ is the recipient attributes (e.g., historical engagement times, location, device type, segment), and $X_m$ is the message attributes (e.g., message language, topic, content embeddings, subject-embeddings).

The p(engage) score is used to rank engagement scoring while considering how components like send time affect the recipient's likelihood to engage with a message. Components such as send time can be treated as a variable or a constant and can be predicted using another model and plugged into the equation (1).

The result of the inference 314 is an optimization value 316 (e.g., send email on Tuesday between 6:00 AM and 6:30 AM). These inputs may be provided to the API 318 and the optimization values 316 are also received via the API 318.

Once the marketer receives the optimization value 316, the marketer may accept the recommendation or make a decision based on the recommendation. In some example embodiments, an option is provided to the marketer to implement optimization decisions automatically, which is useful when dealing with a large number of customers.

In some example embodiments, the optimization value 316 is presented for half-hour intervals for weekends and weekdays. In other example embodiments, the optimization 316 is presented for continuous values including time and day of the week.

Figure 4:
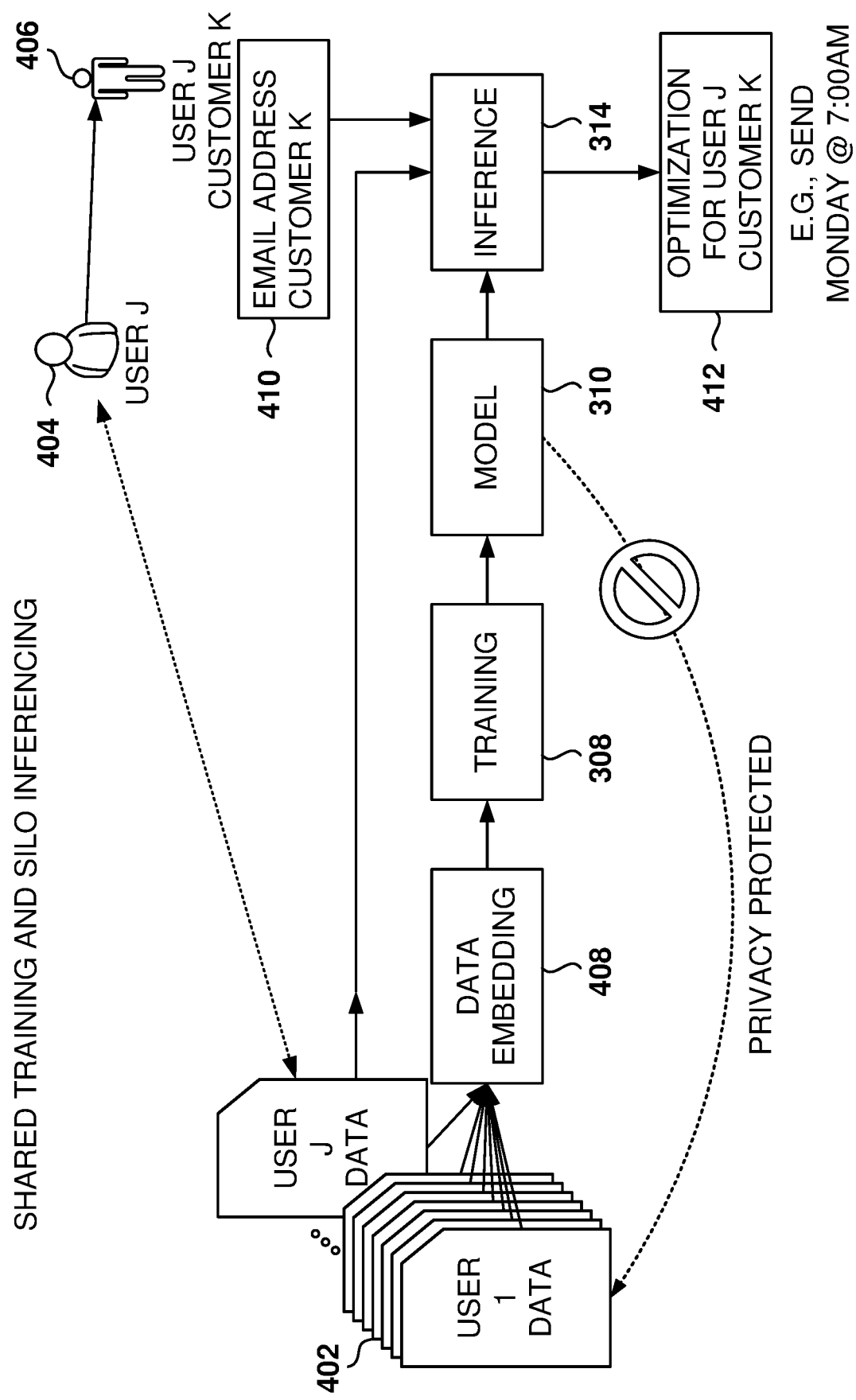
FIG. 4 illustrates the use of shared training and silo inferencing, according to some example embodiments.

FIG. 4 illustrates the use of shared training and silo inferencing, according to some example embodiments. In some example embodiments, training 308 is shared and inferencing 314 is siloed, which means that training 308 is performed with data 402 from difference users (e.g., companies using the service) but inferencing 314 is only performed with the data of the user 404 making the inference 314.

If each model 310 is trained with the data from one user, then monitoring and maintaining many models 310 in production is not scalable and difficult to support and implement.

The privacy of the different users is protected by assuring that the model 310 is not able to be used to identify specific user data 402. For example, data embedding 408 (e.g., encoding into vectors) is performed on the user data before the training 308 is executed.

In the illustrated example in FIG. 4, a user J 404 is performing optimization for a customer K 406. During inference 314, the data 410 (e.g., email address of customer K) for user J 404 and customer K 406 is utilized to obtain the optimization 412 (e.g., send email on Monday at 7:00 AM).

Pooling data across multiple users 402 to train the model 310 allows the model 310 to learn more meaningful patterns because of the higher diversity of customer information.

In some example embodiments, some of the user data 402 is removed for the training set. In some example embodiments, the subject line of email communications was removed from the training to maintain data privacy. In other example embodiments, Personally Identifiable Information (PII) is removed from the email data before the data is embedded to be used as training data.

In some cases, there is too much data for training, such as data from all the emails sent by the email sender for a year. For example, the data may include half a billion messages, and processing that large number of messages for training would require a large amount of resources. In some example embodiments, the data is sub-sampled (e.g., filtered) to reduce the training set. For example, only the data for a period of 90 days is used. In other example embodiments, larger time windows for the training data are used, but the data is randomly reduced (e.g., use data for a period of 180 days, and the data is randomly reduced by one half).

In some example embodiments, the ML model 310 utilizes both historical and dynamic features to make predictions at the time of the inference 314. Historical features can be precalculated using historical data prior to the time of the request for predictions to the endpoint. Dynamic data are calculated at the time of the request because the data is not available until the time of the inference 314 (e.g., the email being sent).

For example, the subject line is a dynamic feature that is sent in the API payload by the user because this data is known at the time when the request for the inference 314 is made. The subject line is a meaningful feature to predict send time as well as message content.

In some example embodiments, using dynamic features is a choice provided to the user in the API. The subject line can be used to get highly personalized and near-real time predictions. On other embodiments, historic features are calculated ahead of the send-time (e.g., based on a profile of the recipient) for each recipient and stored for future use.

Figure 5:
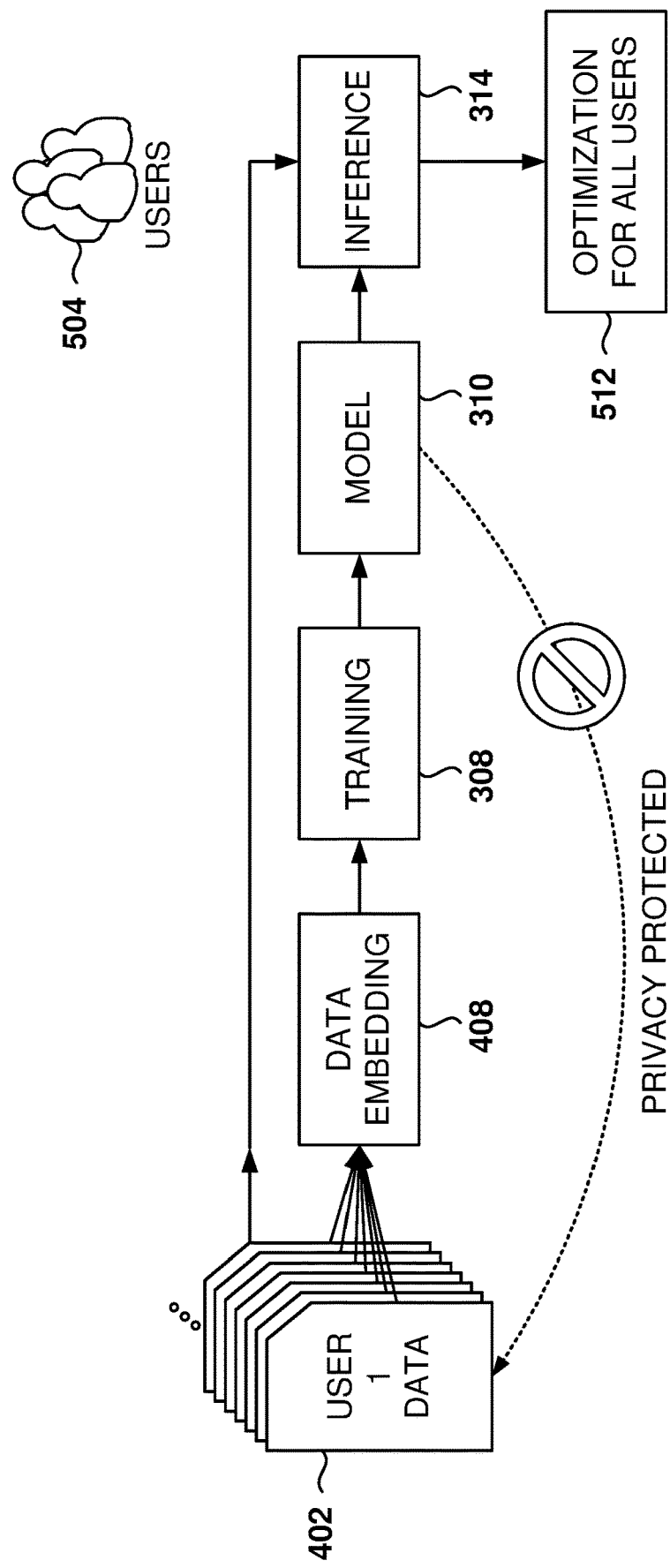
FIG. 5 illustrates the use of shared training and inferencing with privacy protection, according to some example embodiments.

FIG. 5 illustrates the use of shared training and inferencing with privacy protection, according to some example embodiments. In general, when using machine learning, the data used for training is the same type of data used for inferencing. In some example embodiments, the user data 402 of all users 504 is used for training 308 and also during inference 314. This way, the result of the inference 314 is optimization 512 for all users (and all their customers).

When using data for all users 504, privacy is protected by anonymizing the training data such that the training data may not be used to identify PII. The data anonymization may be performed in different ways, such as by deleting part of the data for training (e.g., not using email subject line, deleting names from the email body, etc.) and/or by using data embeddings 408 that encode the data in a way that assures that the training data of a particular user can not be identified when using the model 310.

Some data may cause the model 310 to perform inadequately in some cases, such as when the data is biased. Bias may occur when there are biased patterns in the data of a user (e.g., user only emails people with an income above the $90^{th}$ percentile) or when a user does not have a lot of data (e.g., the user has joined the service recently). In these cases, the shared training and inferencing will help in reducing or eliminating bias by using the data from a larger pool of users.

Figure 6:
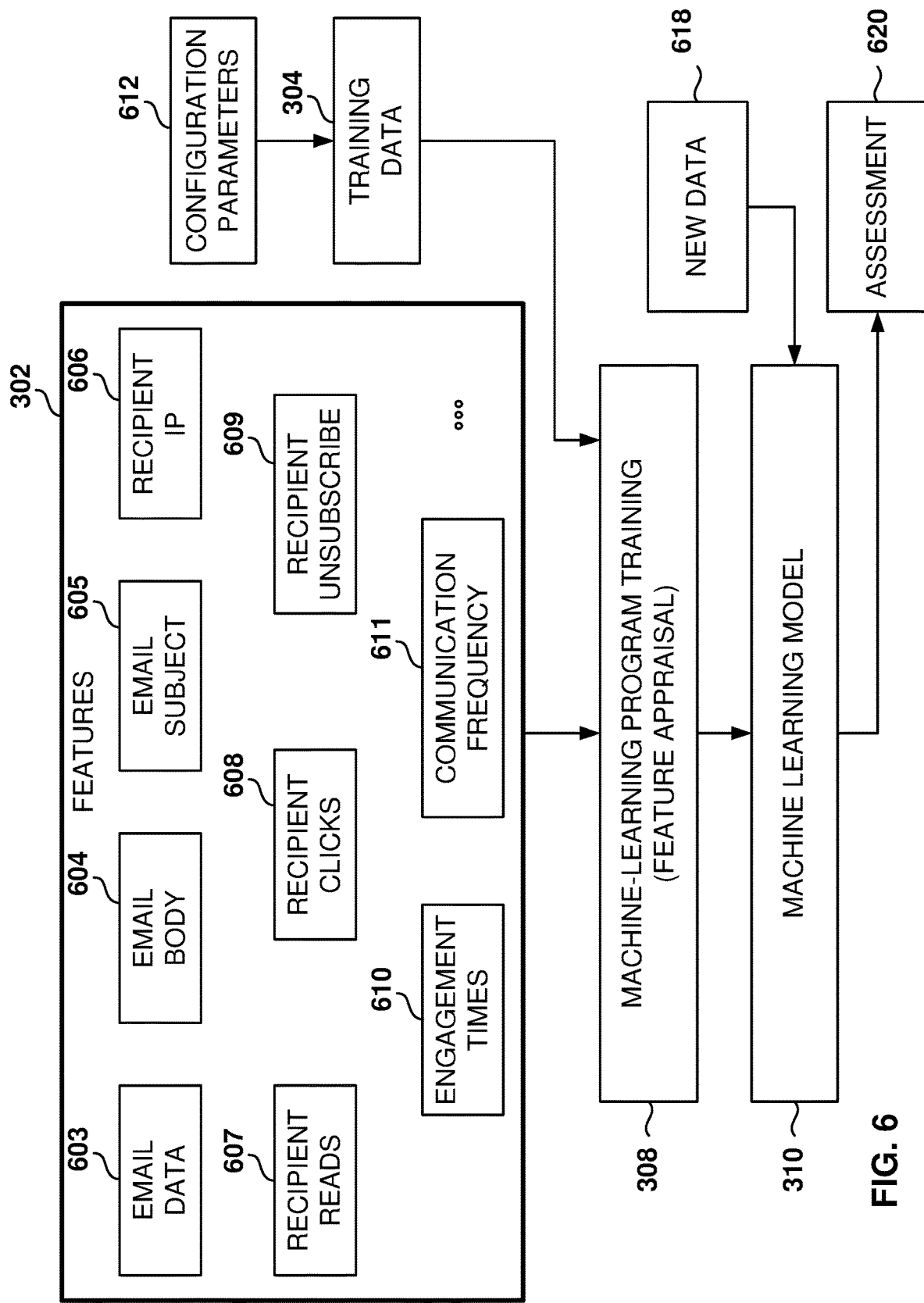
FIG. 6 illustrates the training and use of a machine-learning program (MLP), according to some example embodiments.

FIG. 6 illustrates the training and use of a MLP, according to some example embodiments. In some example embodiments, MLPs, also referred to as ML algorithms or tools, are utilized to build models that determine communication send-time, preferred frequency, preferred channel, and score the user engagement.

ML is an application that provides computer systems the ability to perform tasks, without explicitly being programmed, by making inferences based on patterns found in the analysis of data. ML explores the study and construction of algorithms, also referred to herein as tools, that may learn from existing data and make predictions about new data. Such ML algorithms operate by building an ML model 310 from example training data 304 in order to make data-driven predictions or decisions expressed as outputs or assessments 620. Although example embodiments are presented with respect to a few ML tools, the principles presented herein may be applied to other ML tools.

Data representation refers to the method of organizing the data for storage on a computer system, including the structure, referred also as embeddings, for the identified features and their values. The data may be represented in vectors or matrices of two or more dimensions, which is referred to as embedding. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, an example ML model 310, using new data 618, provides a selected send time for a given communication to an identified person (e.g., send Monday at 8:00 AM). Another ML model 310 provides a frequency of communication (e.g., 3 times a week on weekdays). Another ML model 310 provides a channel selection, which may include one or more channels (e.g., send one SMS and three emails a week to an identified person). Yet another ML model 310 provides a predicted score based on the engagement of a person for a received communication (e.g., score of 0.95 when the recipient reads an email and clicks on a web link).

The training data 304 comprises examples of values for the features 302. In some example embodiments, the training data comprises labeled data with examples of values for the features 302 and labels indicating the outcome, such as recipient read the email. The ML algorithms utilize the training data 304 to find correlations among identified features 302 that affect the outcome. A feature 302 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 302 may be of different types and may include one or more of email data 603, email body 604, email subject 605, recipient Internet Protocol address 606, communications read by the recipient 607, clicks on a communication received by the recipient 608, unsubscribes to communications by the recipient 609, times when the recipient engaged with the communication 610, frequency of communication with the user 611, and so forth.

During training 308, the ML algorithm analyzes the training data 304 based on identified features 302 and configuration parameters 612 defined for the training. The result of the training 308 is an ML model 310 that is capable of taking inputs to produce assessments 620.

Training an ML algorithm involves analyzing large amounts of data (e.g., from several gigabytes to a terabyte or more) in order to find data correlations. The ML algorithms utilize the training data 304 to find correlations among the identified features 302 that affect the outcome or assessment 620. In some example embodiments, the training data 304 includes labeled data, which is known data for one or more identified features 302 and one or more outcomes.

The ML algorithms usually explore many possible functions and parameters before finding what the ML algorithms identify to be the best correlations within the data; therefore, training may require large amounts of computing resources and time.

Many ML algorithms include configuration parameters 612, and the more complex the ML algorithm, the more parameters there are that are available to the user. The configuration parameters 612 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that requires a large amount of computer resources.

Figure 7:
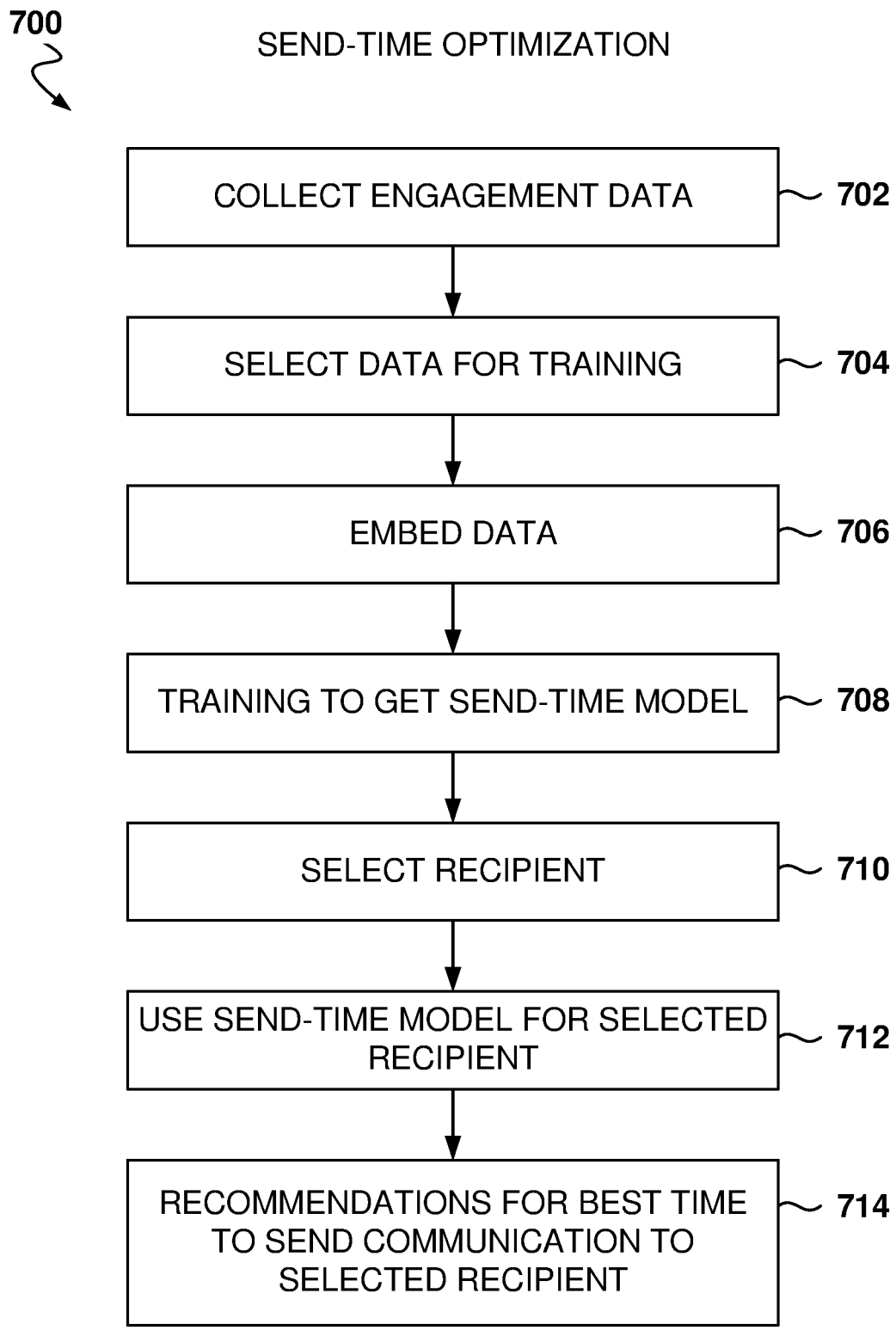
FIG. 7 is a flowchart of a method for send-time optimization, according to some example embodiments.

FIG. 7 is a flowchart of method 700 for send-time optimization, according to some example embodiments. While the various operations in this flowchart are presented and described sequentially, one of ordinary skill will appreciate that some or all of the operations may be executed in a different order, be combined or omitted, or be executed in parallel.

At operation 702, engagement data is collected, where the engagement data includes, at least, past communications sent to recipients and the level of engagement of these recipients in response to the past communications.

From operation 702, the method 700 flows to operation 704 where the data for the training set is selected (e.g., filtering some of the available data).

At operation 706, the data of the training set is embedded. In some example embodiments, embedding the data includes creating a vector for each recipient where the values of the vector correspond to the data for that particular recipient for the identified features.

From operation 706, the method 700 flows to operation 708 where the ML algorithm is trained to obtain the send-time model.

At operation 710, a recipient of the communication is selected (e.g., a user of the email service selects one of the customers), and at operation 712, the send-time model is used, for the selected recipient, by inputting the data of the selected recipient to the send-time model.

The send-time model generates recommendations, at operation 714, for the best time, or times, to send the communication to the selected recipient. In some example embodiments, the output of the send-time model includes one or more ranges (provided in a vector), where each range includes a begin time and an end time for the best send time. In example embodiments, the ranges are incorporated into a message transmission pipeline, which automatically sends the communication at a time within the ranges.

Figure 8:
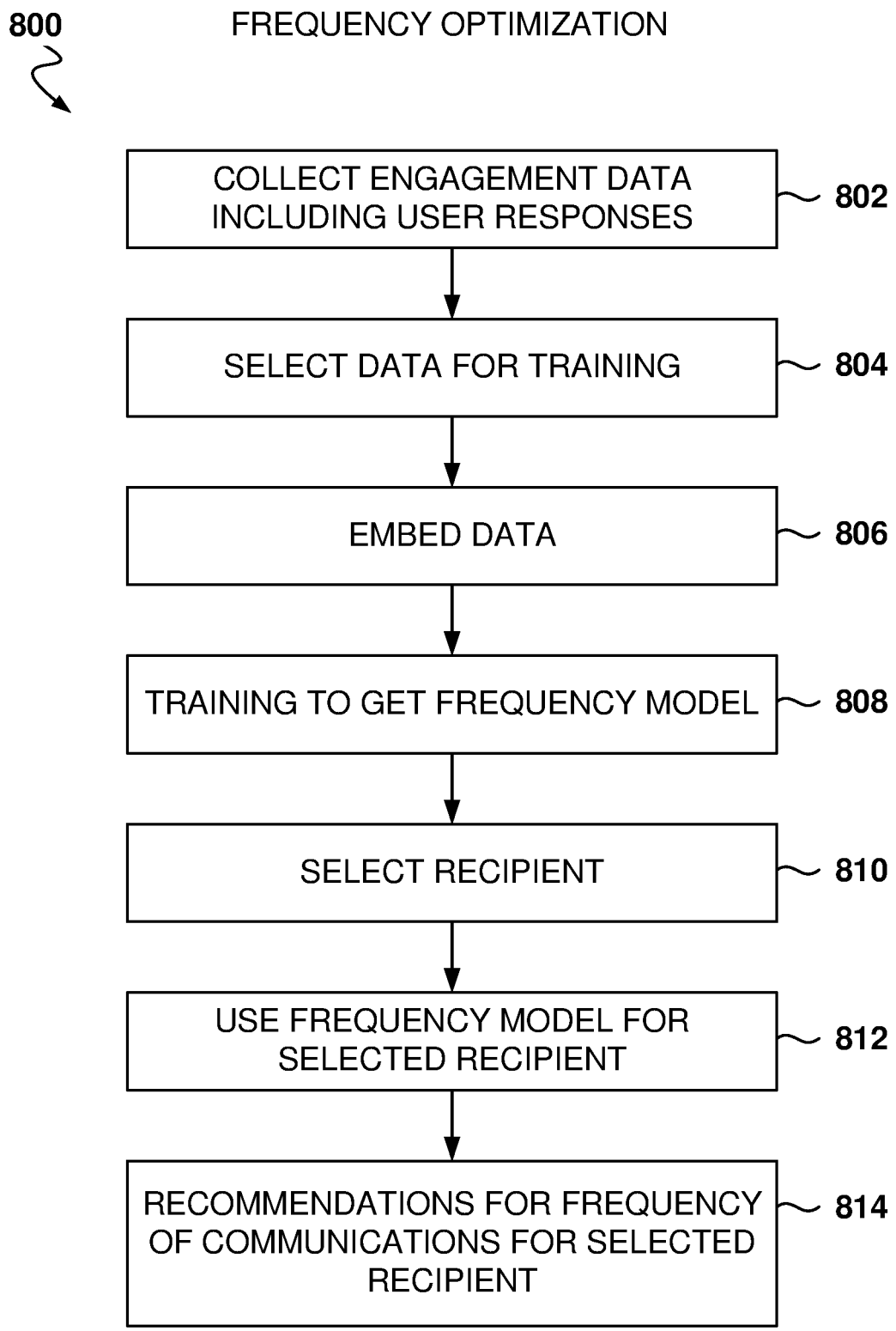
FIG. 8 is a flowchart of method for transmission-frequency optimization, according to some example embodiments.

FIG. 8 is a flowchart of method 800 for transmission-frequency optimization, according to some example embodiments. While the various operations in this flowchart are presented and described sequentially, one of ordinary skill will appreciate that some or all of the operations may be executed in a different order, be combined or omitted, or be executed in parallel.

At operation 802, engagement data is collected, where the engagement data includes, at least, past communications sent to recipients and the level of engagement of these recipients in response to the past communications.

From operation 802, the method 800 flows to operation 804 where the data for the training set is selected (e.g., filtering some of the available data).

At operation 806, the data of the training set is embedded. In some example embodiments, embedding the data includes creating a vector for each recipient where the values of the vector correspond to the data for that particular recipient.

From operation 806, the method 800 flows to operation 808 where the ML algorithm is trained to obtain the frequency model.

At operation 810, a recipient of the communication is selected (e.g., a user of the email service selects one of the customers), and at operation 812, the frequency model is used for the selected recipient by inputting the data of the selected recipient to the frequency model.

The frequency model generates recommendations, at operation 814, for the best frequency to send communications to the selected recipient (e.g., 3 times a week, 5 times a month, every Monday). In some example embodiments, the output of the frequency model includes the number of communications to be sent per week, but other types of outputs are possible, such as the number of communications per week, the number of communications per weekend, the number of communications per month, the number of communications for a given day of the week, etc. These recommended frequencies are automatically incorporated into the message transmission pipeline and used when sending the communications.

Figure 9:
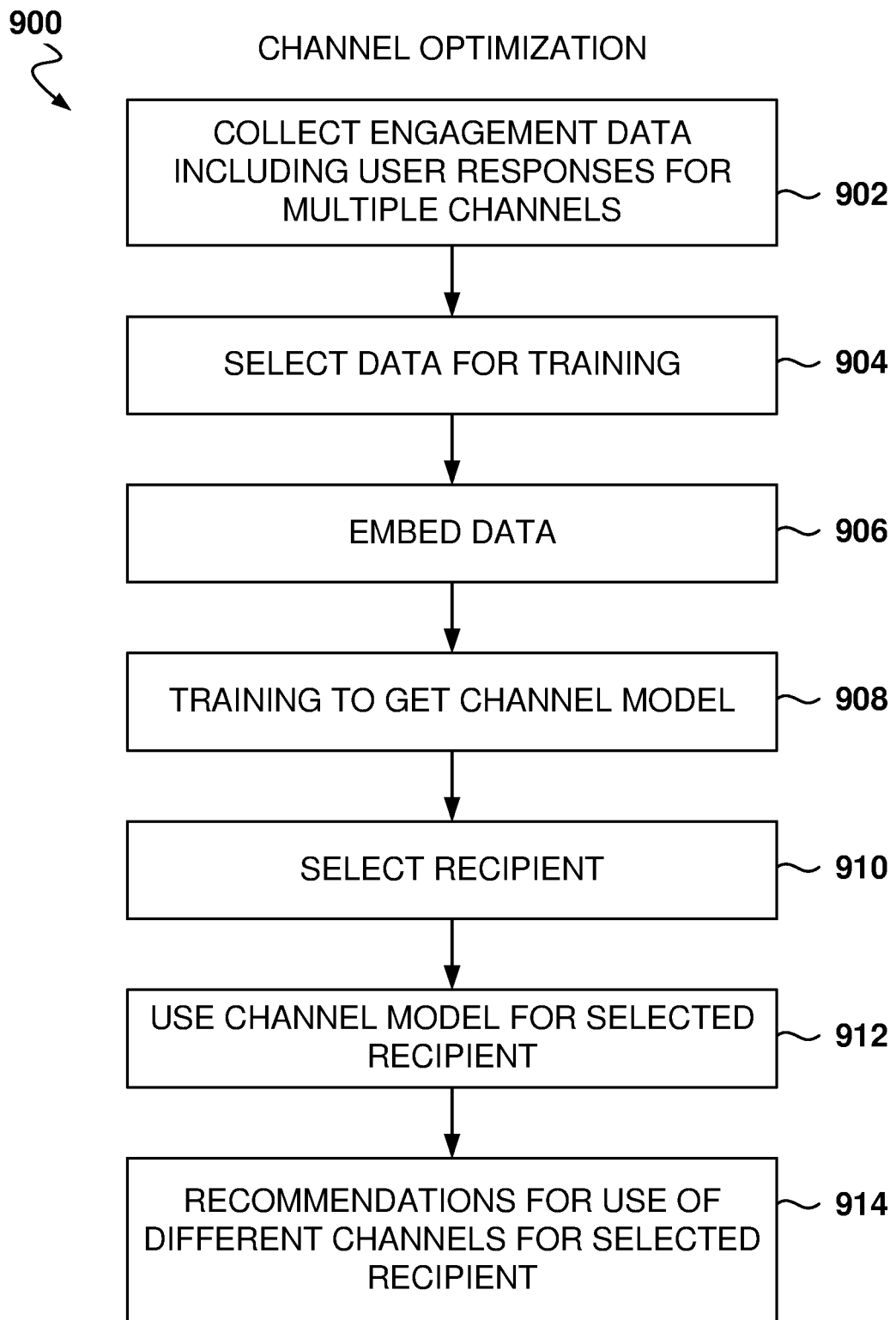
FIG. 9 is a flowchart of method for channel optimization, according to some example embodiments.

FIG. 9 is a flowchart of method 900 for channel optimization, according to some example embodiments. While the various operations in this flowchart are presented and described sequentially, one of ordinary skill will appreciate that some or all of the operations may be executed in a different order, be combined or omitted, or be executed in parallel.

At operation 902, engagement data is collected, where the engagement data includes, at least, past communications sent to recipients and the level of engagement of these recipients in response to the past communications.

From operation 902, the method 900 flows to operation 904 where the data for the training set is selected (e.g., filtering some of the available data). In some example embodiments, the training set includes data regarding user responses to communications throughout different channels, which means that channel of communication is one of the features used in the channel model.

At operation 906, the data of the training set is embedded. In some example embodiments, embedding the data includes creating a vector for each recipient where the values of the vector correspond to the data for that particular recipient.

From operation 906, the method 900 flows to operation 908 where the ML algorithm is trained to obtain the channel model.

At operation 910, a recipient of the communication is selected (e.g., a user of the email service selects one of the customers), and at operation 912, the channel model is used for the selected recipient by inputting the data of the selected recipient to the channel model.

The channel model generates recommendations, at operation 914, for the best channel, or channels (e.g., email, SMS, phone, WhatsApp), to send communications to the selected recipient. In some example embodiments, the channel model provides a score for each of the available channels, and the higher the score, the higher the probability that the user will engage through that channel.

Figure 10A:
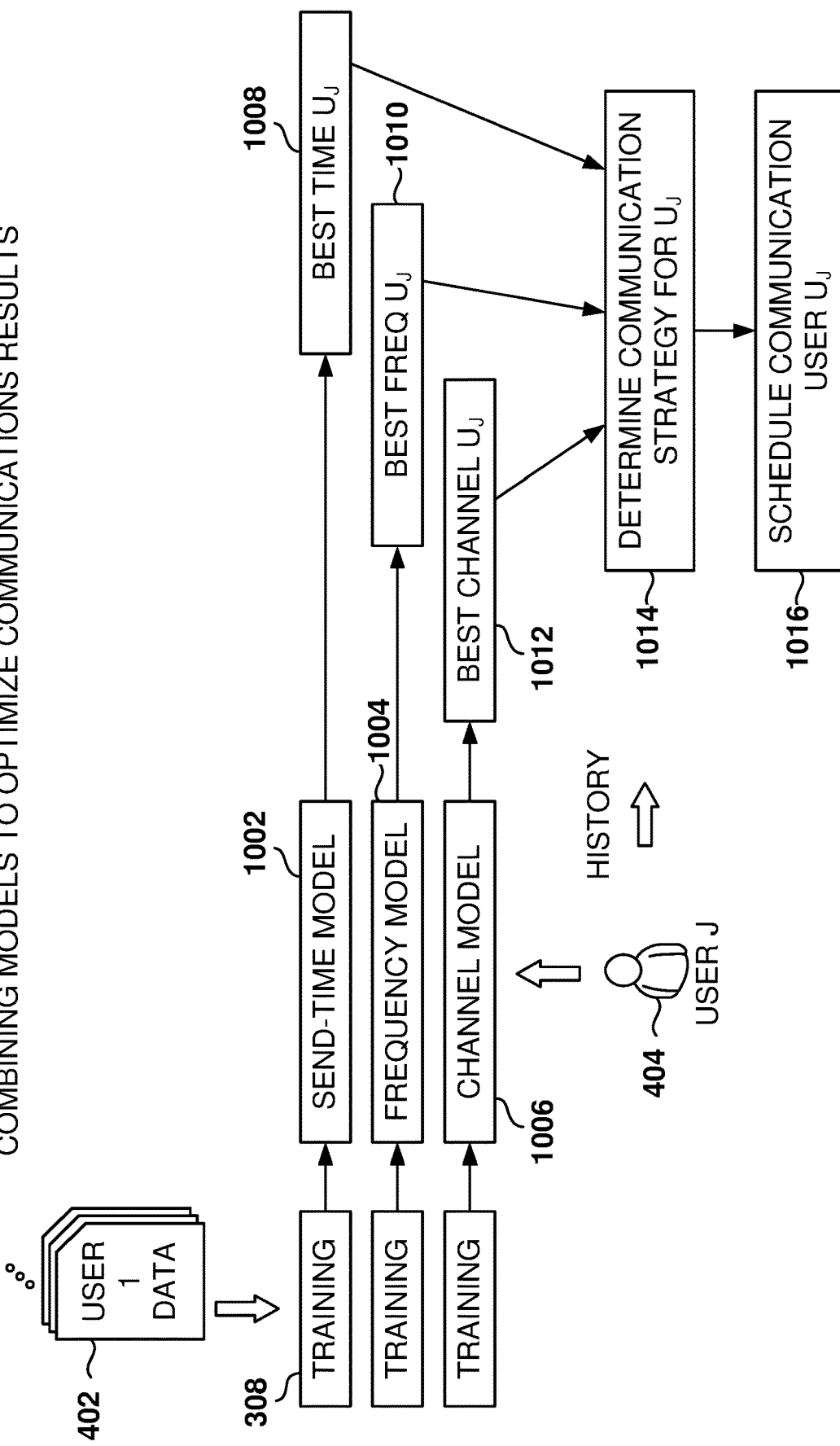
FIG. 10A illustrates the building of a communication strategy for a user based on a plurality of models, according to some example embodiments.

FIG. 10A illustrates the building of a communication strategy for a user based on a plurality of models, according to some example embodiments. The user data 402 is used to create the training sets, as described above, for the different models. Each model uses different features, with the corresponding values in the user data 402, to train the corresponding model. In some example embodiments, two or more models may utilize the same feature.

After the training processes, three models are built: the send-time model 1002, the frequency model 1004, and the channel model 1006. Given a communication for a user $U_j$ 404, the send-time model 1002 determines the best time 1008, or times, to send the communication to $U_j$. Further, the frequency model 1004 determines the best frequency of communications for $U_j$, and the channel model 1006 determines the best channel 1012, or channels, for $U_j$.

The outputs for the different models are combined operation 1014 determined the communication strategy for $U_1$. For example, the best time 1008 is weekdays between 6:00 AM and 7:00 AM, the best frequency 1010 is once a week during the week and once a week during the weekend, and the best channel is email with a score of 0.9 out of a maximum of 1, and a score of 0.25 for SMS communications.

Additionally, the communication history with $U_j$ is used to determine the schedule communications for $U_j$ 1016 at the current time. For example, give the relative low score of SMS communications, the system may determine to send one SMS message a month to the user, and the system will wait at least one month from the last SMS communication to send the next communication. In the illustrated example, the system combines the outputs from the models to determine sending one email on Tuesday between 6:00 AM and 7:00 AM and another email on Saturday between 6:00 AM and 7:00 AM. Since the last SMS message was sent two weeks earlier, the system also determines that no SMS message will be sent this week.

It is noted that the embodiments illustrated in FIG. 10 are examples and do not describe every possible embodiment. Other embodiments may utilize fewer models, additional models, or create combination models (e.g., determine best time and frequency by the same model). The embodiments illustrated in FIG. 10 should therefore not be interpreted to be exclusive or limiting, but rather illustrative.

Figure 10B:
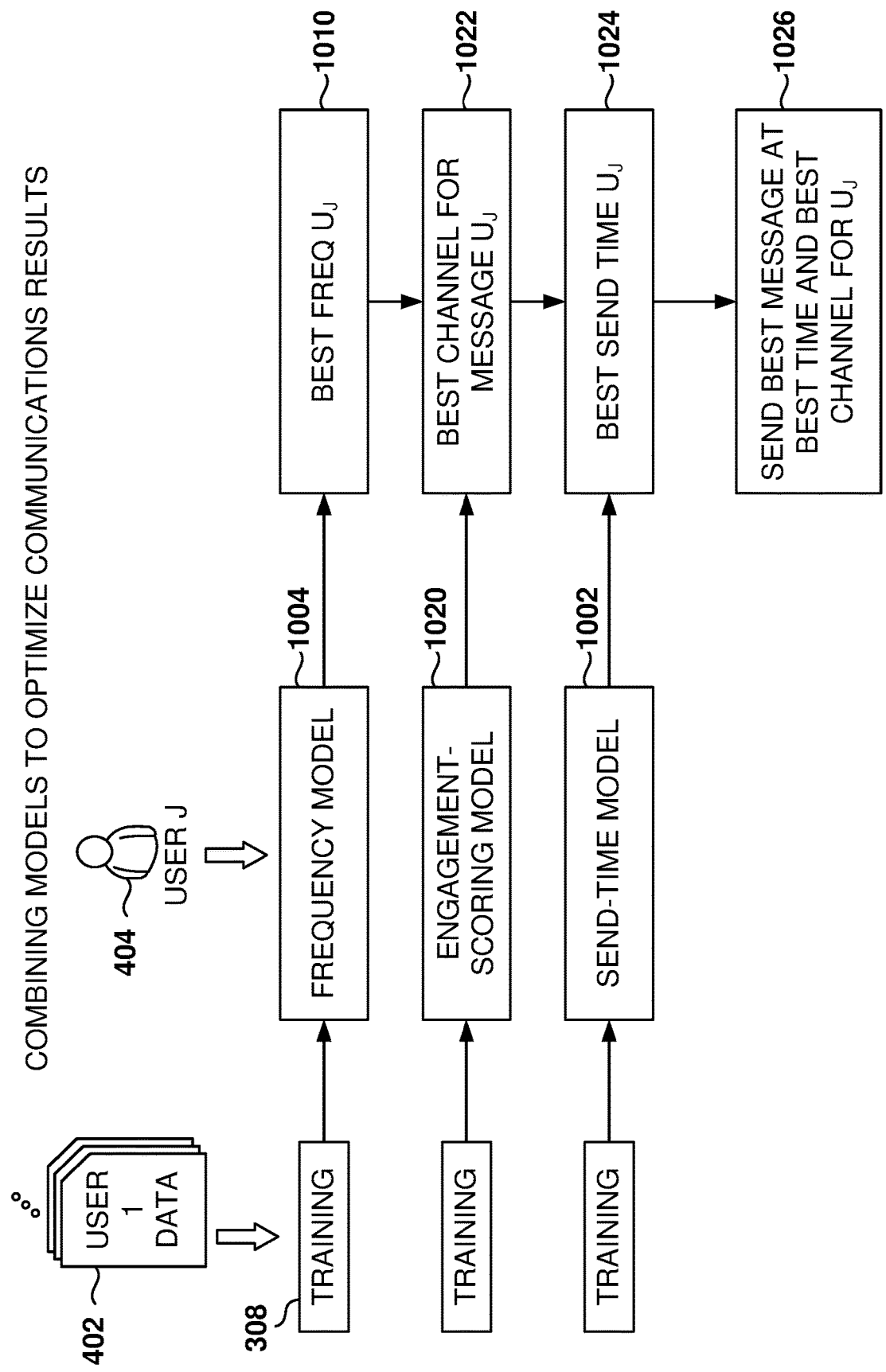
FIG. 10B illustrates another strategy for scheduling communications, according to some example embodiments.

FIG. 10B illustrates another strategy for scheduling communications. In the illustrated example, three models are used: the frequency model 1004, the engagement-scoring model 1020, and the send-time model 1002.

The frequency model 1004 provides the maximum number of messages (e.g., emails, SMS) per period. The engagement-scoring model 1020 provides a score that measures the probability that the user will engage (e.g., click on a link in the message) with the message. Further, the send-time model 1002 selects the best time to send a message.

In this example, the frequency model 1004 is used first to provide the best frequency of communication for a given user. The engagement-scoring model 1020 provides the engagement score while considering the previously identified frequency, e.g., if the maximum number of messages has already been reached within the period, then the score will be zero, or simply omitted, to indicate that no additional messages can be sent in this channel until the next period.

Once the scores are determined, the send-time model 1002 provides the best send time based on the engagement score (and other metrics, such as user characteristics, as previously discussed). One example on how the outputs from the models are used is presented below with reference to FIG. 10C.

Figure 10C:
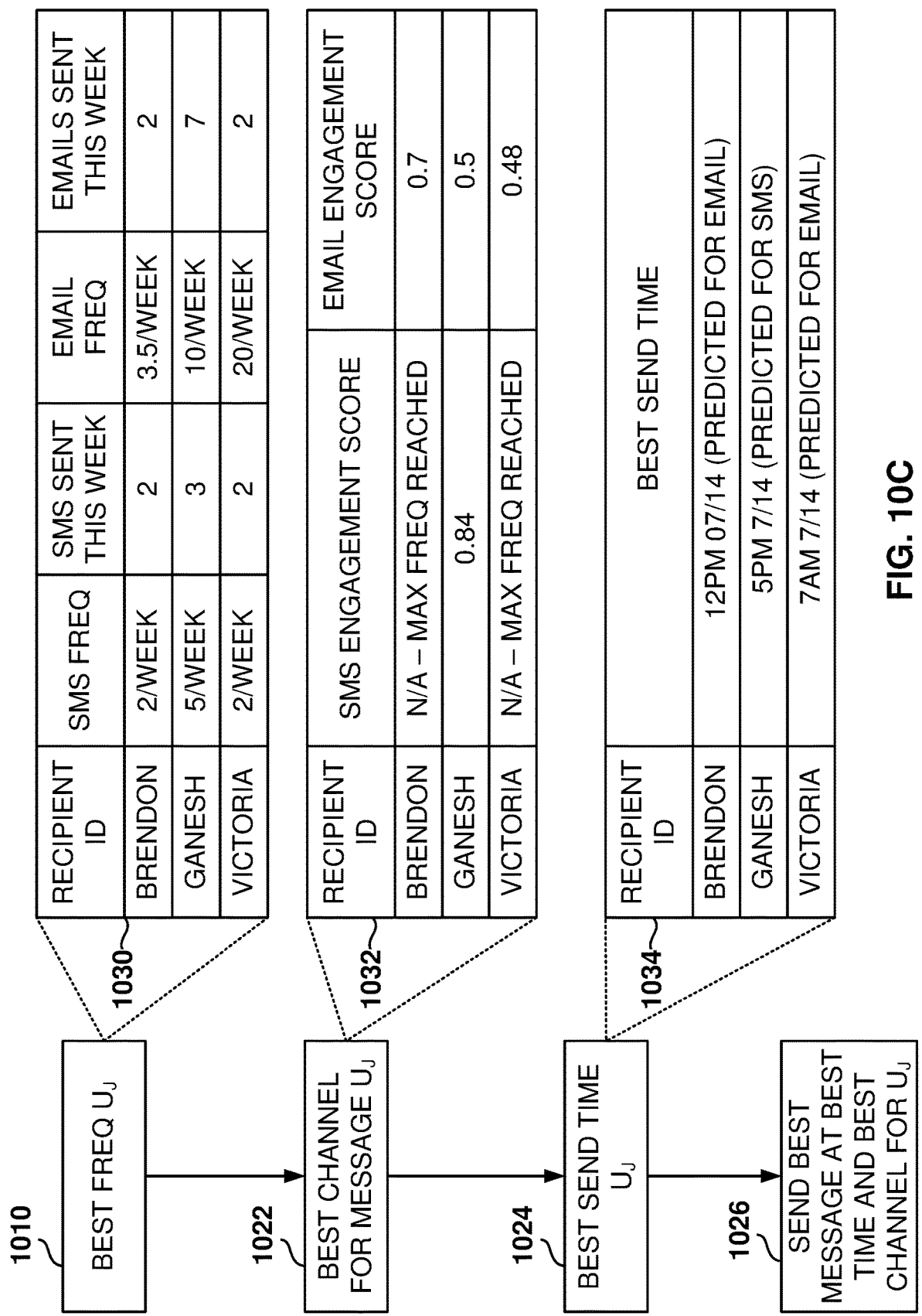
FIG. 10C is an example illustrating how to combine outputs provided by the models, according to some example embodiments.

It is noted that the embodiments illustrated in FIGS. 10A-10C are examples and do not describe every possible embodiment. Other embodiments may utilize different models, use the model outputs in a different order, utilize fewer models, etc. The embodiments illustrated in FIGS. 10A-10C should therefore not be interpreted to be exclusive or limiting, but rather illustrative.

FIG. 10C is an example illustrating how to combine the outputs provided by the models, according to some example embodiments. In this example, the system is evaluating sending emails and SMS messages to three users: Brendon, Ganesh, and Victoria.

Table 1030 shows the output of the frequency model. For each user, the frequency model provides the best SMS frequency, the number of SMS messages sent this week (in this example, the current week is the period used for measuring frequency), the best email frequency, and the number of emails sent this week. For example, for user Brendon, the system selects to send 2 SMS and 3.5 emails per week, and the system has already sent 2 SMS messages and 2 emails this week.

Table 1032 shows the output of the engagement-scoring model. For each user, the engagement-scoring model provides the engagement score for the SMS message and for the email message. However, if the maximum frequency for one of the communication types has been reached during the week, the engagement score will be not be provided (or will be set to 0 or some other representative value) so this communication type will not be used during this period.

For example, for user Brendon, the SMS engagement score is not provided because the maximum frequency has already been reached, and the email engagement score is 0.7. For user Ganesh, both the SMS engagement score of 0.84 and the email engagement score of 0.5 are provided because the maximum frequencies have not been reached for this user during this period.

Table 10324 shows the output of the send-time model. For each user, the send-time model provides the time to send the selected type of communication. For user Brendon, the send-time model has selected 12 PM on July 14 to send an email message. For user Ganesh, the selection is to send and SMS message at 5 PM on the same day, and, for user Victoria, to send an email at 7 AM on the same day. In other example embodiments, the system may select times to send both an SMS message and an email message.

Figure 11:
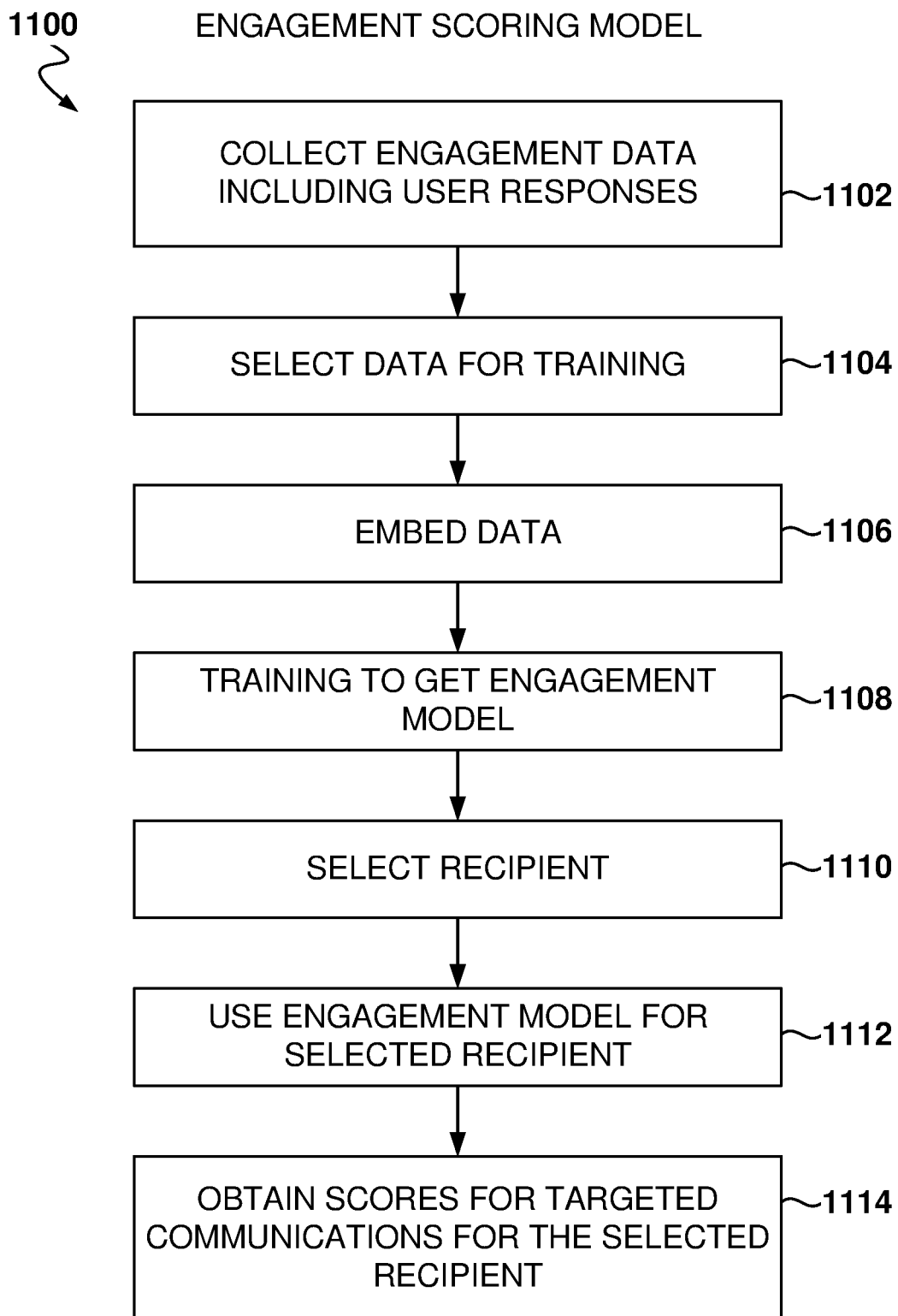
FIG. 11 is a flowchart of method for calculating an engagement scoring model, according to some example embodiments.

FIG. 11 is a flowchart of method 1100 for calculating an engagement scoring model, according to some example embodiments. While the various operations in this flowchart are presented and described sequentially, one of ordinary skill will appreciate that some or all of the operations may be executed in a different order, be combined or omitted, or be executed in parallel.

At operation 1102, engagement data is collected, where the engagement data includes, at least, past communications sent to recipients and the level of engagement of these recipients in response to the past communications.

From operation 1102, the method 1100 flows to operation 1104 where the data for the training set is selected (e.g., filtering some of the available data).

At operation 1106, the data of the training set is embedded. In some example embodiments, embedding the data includes creating a vector for each recipient where the values of the vector correspond to the data for that particular recipient.

From operation 1106, the method 1100 flows to operation 1108 where the ML algorithm is trained to obtain the engagement-scoring model.

At operation 1110, a recipient of the communication is selected (e.g., a user of the email service selects one of the customers), and at operation 1112, the engagement-scoring model is used for the selected recipient by inputting the data of the selected recipient to the engagement-scoring model.

The send-time model generates recommendations, at operation 1114, for the predicted engagement score for the recipient based on a possible communication. In some example embodiments, the engagement score is a real number between 0 and 1 which indicates the probability that the user engages with the communication. In some example embodiments, different engagement scores may be provided, such as a first engagement score for reading the communication and a second engagement score for responding to the communication (e.g., clicking on a web link).

Figure 12:
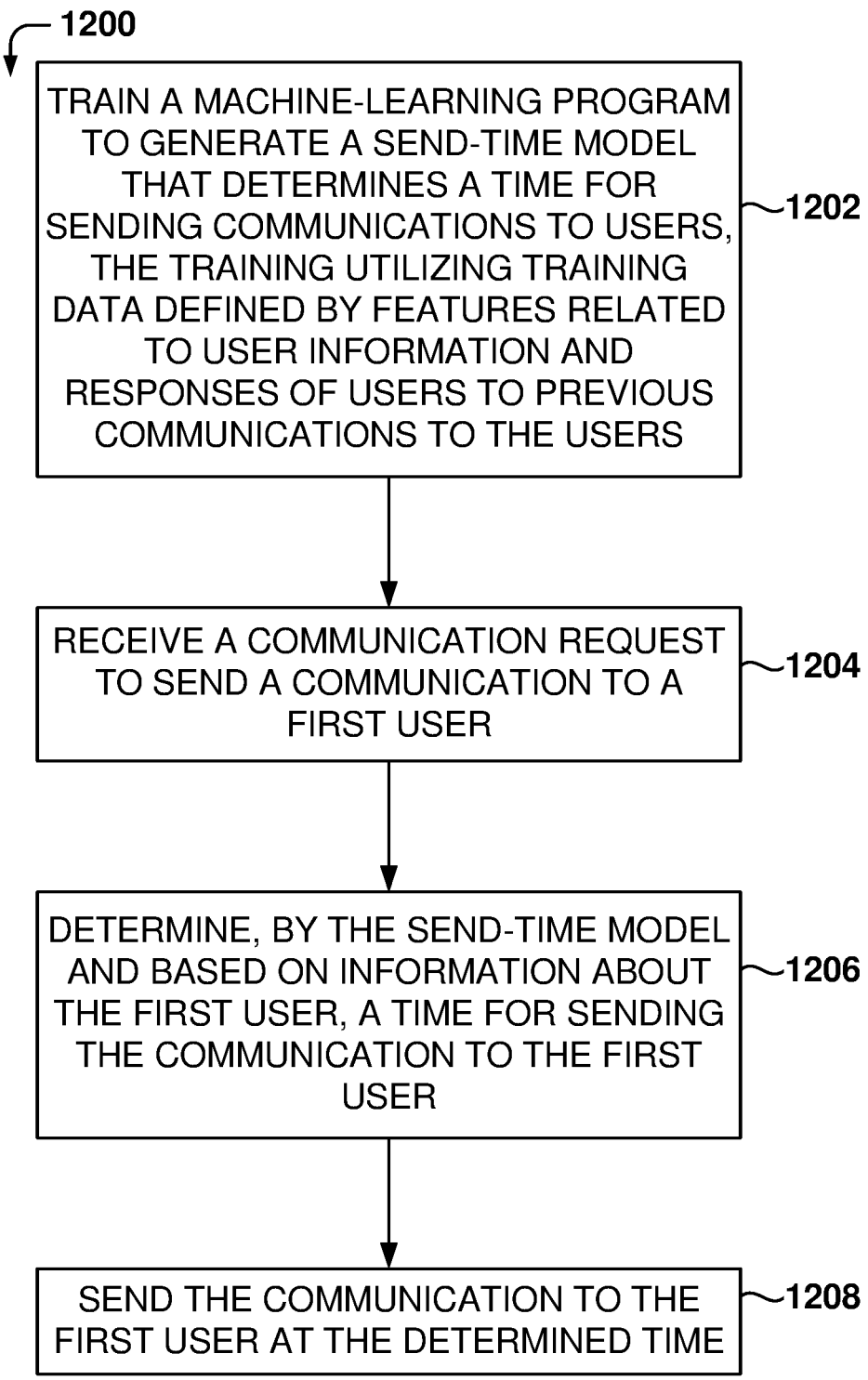
FIG. 12 is a flowchart of a method for determining the send-time optimization to communicate with a user, according to some example embodiments.

FIG. 12 is a flowchart of a method 1200 for determining the send-time optimization to communicate with a user, according to some example embodiments.

At operation 1202, one or more processors train a machine-learning program to generate a send-time model that determines a time for sending communications to users. The training utilizes training data defined by features related to user information and responses of users to previous communications to the users.

From operation 1202, the method flows to operation 1204 where the one or more processors receive a communication request to send a communication to a first user.

From operation 1204, the method flows to operation 1206 for determining, by the send-time model and based on information about the first user, a time for sending the communication to the first user.

From operation 1206, the method flows to operation 1208 where the one or more processors send the communication to the first user at the determined time.

In one example, the features of the training data include one or more of email data, text of email body, text of email subject, recipient Internet Protocol (IP) address, flag indicating if recipients read the previous communications, flag indicating if recipients selected a link in the previous communications, flag indicating if recipients unsubscribed to messages from a sender in response to the previous communications, and times when recipients engaged with the previous communications.

In one example, the method 1200 further comprises, collecting, before the training, information about the previous communications to users and the responses of the users to the previous communications, and embedding the collected information into vectors to generate the training data for the machine-learning program.

In one example, the responses of users to previous communications include an indication if the users read the previous communications and an indication if the users selected a link in the previous communications.

In one example, the time for sending the communication is defined as one or more of a specific time, a range of possible times, a day of the week, a weekday, and a weekend.

In one example, the information about the first user includes profile information of the first user and responses of the first user to previous communications.

In one example, the method 1200 further comprises presenting, to a sender of the communication to the first user, information about the determined time; and providing a user interface to the sender to validate the sending of the communication to the first user.

In one example, the method 1200 further comprises determining, by a frequency model, a frequency of communications to the first user; and combining the information provided by the send-time model and the frequency model to determine a communication strategy for the first user.

In one example, the method 1200 further comprises determining, by a channel model, a best channel for sending communications to the first user; and combining the information provided by the send-time model and the channel model to determine a communication strategy for the first user.

In one example, the communications are one of an email message or a Short Message Service (SMS) message.

Another general aspect is for a system that includes a memory comprising instructions and one or more computer processors. The instructions, when executed by the one or more computer processors, cause the one or more computer processors to perform operations comprising: training a machine-learning program to generate a send-time model that determines a time for sending communications to users, the training utilizing training data defined by features related to user information and responses of users to previous communications to the users; receiving a communication request to send a communication to a first user; determining, by the send-time model and based on information about the first user, a time for sending the communication to the first user; and sending the communication to the first user at the determined time.

In yet another general aspect, a machine-readable storage medium (e.g., a non-transitory storage medium) includes instructions that, when executed by a machine, cause the machine to perform operations comprising: training a machine-learning program to generate a send-time model that determines a time for sending communications to users, the training utilizing training data defined by features related to user information and responses of users to previous communications to the users; receiving a communication request to send a communication to a first user; determining, by the send-time model and based on information about the first user, a time for sending the communication to the first user; and sending the communication to the first user at the determined time.

Figure 13:
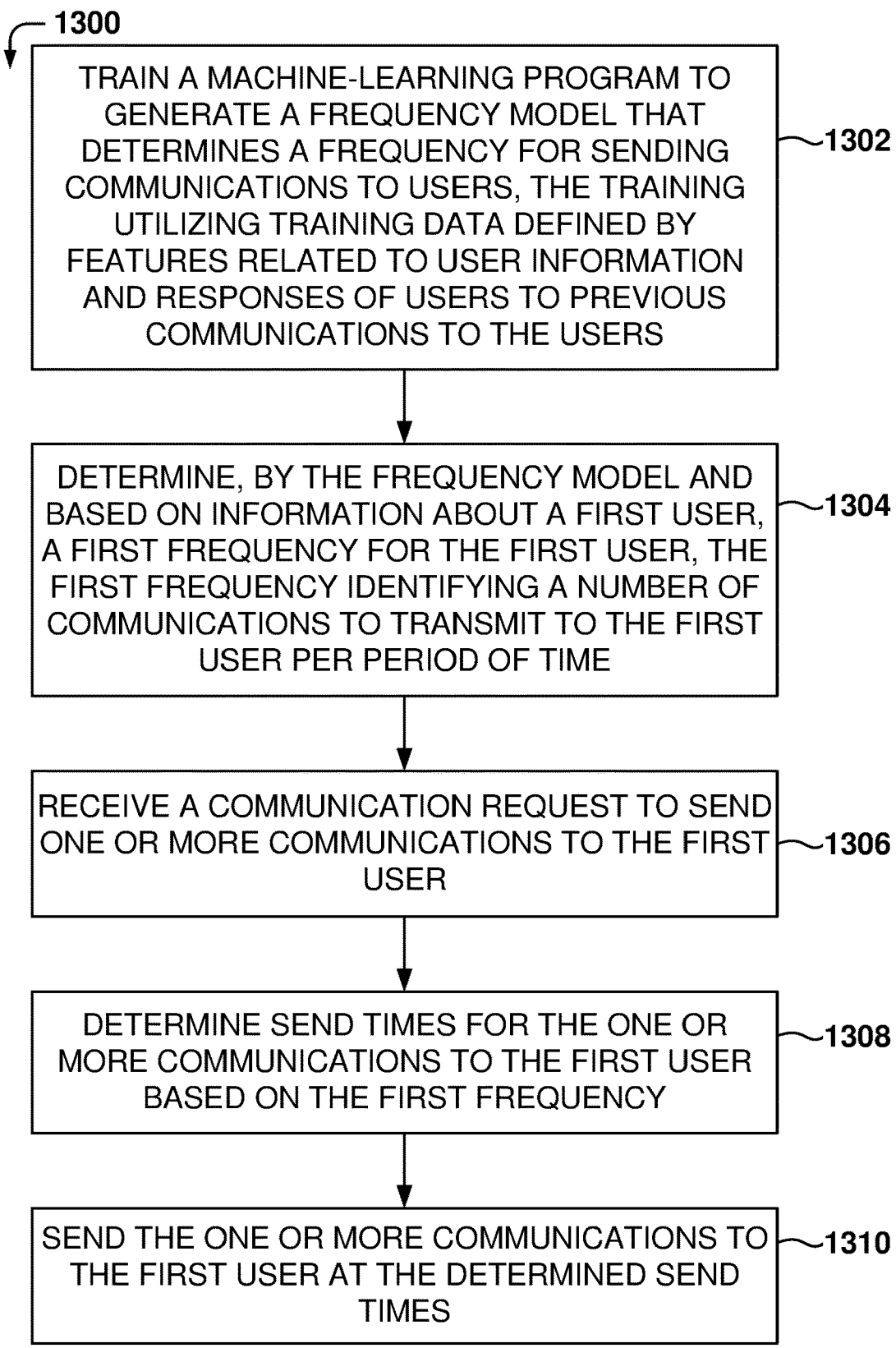
FIG. 13 is a flowchart of a method for determining the transmission-frequency optimization to communicate with a user, according to some example embodiments.

FIG. 13 is a flowchart of a method 1300 for determining the transmission-frequency optimization to communicate with a user, according to some example embodiments. While the various operations in this flowchart are presented and described sequentially, one of ordinary skill will appreciate that some or all of the operations may be executed in a different order, be combined or omitted, or be executed in parallel.

At operation 1302, one or more processors train a machine-learning program to generate a frequency model that determines a frequency for sending communications to users. The training utilizes training data defined by features related to user information and responses of users to previous communications to the users.

From operation 1302, the method 1300 flows to operation 1304 for determining, by the frequency model and based on information about a first user, a first frequency for the first user. The first frequency identifies the number of communications to transmit to the first user per period of time.

From operation 1304, the method 1300 flows to operation 1306 where the one or more processors receive a communication request to send one or more communications to the first user.

From operation 1306, the method 1300 flows to operation 1308 for determining send times for the one or more communications to the first user based on the first frequency.

From operation 1308, the method 1300 flows to operation 1310 was the one or more processors send the one or more communications to the first user at the determined send times.

In one example, the features of the training data include one or more of email data, text of email body, text of email subject, frequency of communication with the user, flag indicating if recipients read the previous communications, flag indicating if recipients selected a link in the previous communications, flag indicating if recipients unsubscribed to messages from a sender in response to the previous communications, and times when recipients engaged with the previous communications.

In one example, the method 1300 further comprises, before the training, collecting information about the previous communications to users and the responses of the users to the previous communications; and embedding the collected information into vectors to generate the training data for the machine-learning program.

In one example, the responses of users to previous communications include an indication if the users read the previous communications, an indication if the users selected a link in the previous communications, and an indication if the users selected an option to unsubscribe from future communications from a sender of the communication.

In one example, the first frequency indicates one or more of number of communications per day, number of communications per week, and number of communications per month.

In one example, the information about the first user includes profile information of the first user and responses of the first user to previous communications.

In one example, the method 1300 further comprises presenting, to a sender of the communication to the first user, information about the determined send times; and providing a user interface to the sender to validate the sending of the communications to the first user at the determined send times.

In one example, the method 1300 further comprises determining, by a send-time model, a best time of the day for sending communications to the first user; and combining the information provided by the send-time model and the frequency model to determine a communication strategy for the first user.

In one example, the method 1300 further comprises determining, by a channel model, a best channel for sending communications to the first user; and combining the information provided by the frequency model and the channel model to determine a communication strategy for the first user.

In one example, the communications are one of an email message or a Short Message Service (SMS) message.

Another general aspect is for a system that includes a memory comprising instructions and one or more computer processors. The instructions, when executed by the one or more computer processors, cause the one or more computer processors to perform operations comprising: train a machine-learning program to generate a frequency model that determines a frequency for sending communications to users, the training utilizing training data defined by features related to user information and responses of users to previous communications to the users; determine, by the frequency model and based on information about a first user, a first frequency for the first user, the first frequency identifying a number of communications to transmit to the first user per period of time; receive a communication request to send one or more communications to the first user; determine send times for the one or more communications to the first user based on the first frequency; and send the one or more communications to the first user at the determined send times.

In yet another general aspect, a machine-readable storage medium (e.g., a non-transitory storage medium) includes instructions that, when executed by a machine, cause the machine to perform operations comprising: train a machine-learning program to generate a frequency model that determines a frequency for sending communications to users, the training utilizing training data defined by features related to user information and responses of users to previous communications to the users; determine, by the frequency model and based on information about a first user, a first frequency for the first user, the first frequency identifying a number of communications to transmit to the first user per period of time; receive a communication request to send one or more communications to the first user; determine send times for the one or more communications to the first user based on the first frequency; and send the one or more communications to the first user at the determined send times.

Figure 14:
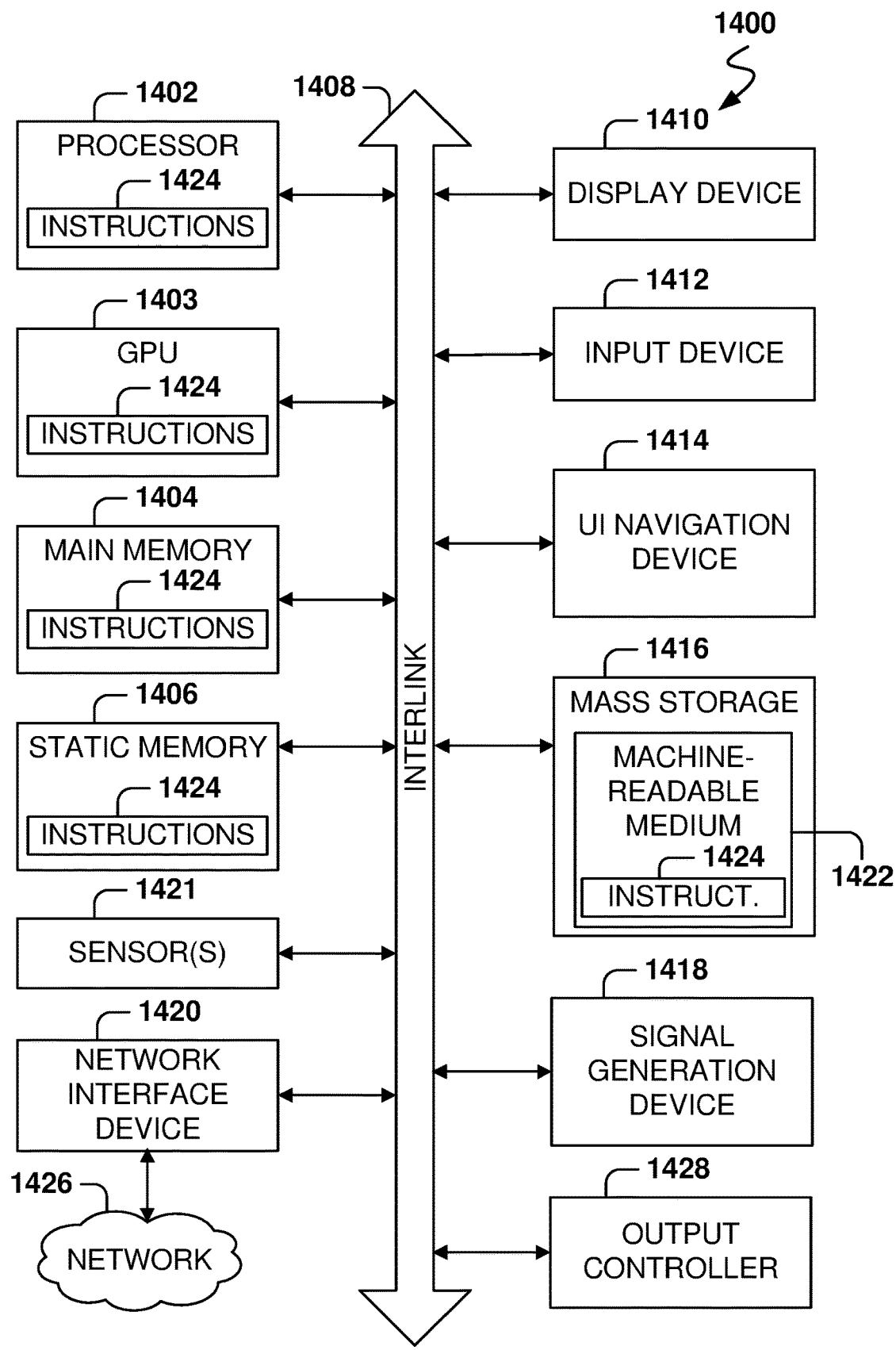
FIG. 14 is a block diagram illustrating an example of a machine 900 upon or by which one or more example process embodiments described herein may be implemented or controlled.

FIG. 14 is a block diagram illustrating an example of a machine 1400 upon or by which one or more example process embodiments described herein may be implemented or controlled. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in a peer-to-peer (P2P) (or other distributed) network environment. Further, while only a single machine 1400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1400 may include a hardware processor 1402 (e.g., a central processing unit (CPU), a hardware processor core, or any combination thereof), a graphics processing unit (GPU) 1403, a main memory 1404, and a static memory 1406, some or all of which may communicate with each other via an interlink (e.g., bus) 1408. The machine 1400 may further include a display device 1410, an alphanumeric input device 1412 (e.g., a keyboard), and a user interface navigation device 1414 (e.g., a mouse). In an example, the display device 1410, alphanumeric input device 1412, and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1421, such as a Global Positioning System (GPS) sensor, compass, accelerometer, or another sensor. The machine 1400 may include an output controller 1428, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, within the hardware processor 1402, or within the GPU 1403 during execution thereof by the machine 1400. In an example, one or any combination of the hardware processor 1402, the GPU 1403, the main memory 1404, the static memory 1406, or the mass storage device 1416 may constitute machine-readable media.

While the machine-readable medium 1422 is illustrated as a single medium, the term "machine-readable medium" may include a single medium, or multiple media, (e.g., a centralized or distributed database, and/or associated caches and servers) configured to store the one or more instructions 1424.

The term "machine-readable medium" may include any medium that is capable of storing, encoding, or carrying instructions 1424 for execution by the machine 1400 and that cause the machine 1400 to perform any one or more of the techniques of the present disclosure, or that is capable of storing, encoding, or carrying data structures used by or associated with such instructions 1424. Non-limiting machine-readable medium examples may include solid-state memories, and optical and magnetic media. In an example, a massed machine-readable medium comprises a machine-readable medium 1422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    training, by one or more processors, a machine-learning program to generate a send-time model, the training utilizing training data defined by features related to information about users and responses of the users to previous communications to the users, the generated send-time model being configured to determine a time range for sending communications to users;
    receiving, by the one or more processors, a communication request to send a communication to a first user;
    determining, by the send-time model and based on first information about the first user, a first time range for sending the communication to the first user, the determined first time range beginning with a begin time and ending with an end time; and
    causing, by the one or more processors, the communication to be sent to the first user within the determined first time range by increasing a priority of the communication from a relatively lower priority of the communication at the begin time of the determined first time range to a relatively higher priority of the communication prior to the end time of the determined first time range.

2. The computer-implemented method as recited in claim 1, wherein the features of the training data include at least one of email data, text of email body, text of email subject, recipient Internet Protocol (IP) addresses, flags indicating if recipients read the previous communications, flags indicating if recipients selected a link in the previous communications, flags indicating if recipients unsubscribed to messages from a sender in response to the previous communications, or times when recipients engaged with the previous communications.

3. The computer-implemented method as recited in claim 1, further comprising:
    before the training, collecting the information about the users and the responses of the users to the previous communications; and
    embedding the collected information into vectors to generate the training data for the machine-learning program.

4. The computer-implemented method as recited in claim 1, wherein the responses of the users to the previous communications include an indication of whether the users read the previous communications and an indication of whether the users selected a link in the previous communications.

5. The computer-implemented method as recited in claim 1, wherein the determined first time range for sending the communication is defined by at least one of a range of times, a day of the week, a weekday, and a weekend.

6. The computer-implemented method as recited in claim 1, wherein the first information about the first user includes profile information of the first user and responses of the first user to previous communications to the first user.

7. The computer-implemented method as recited in claim 1, further comprising:
    presenting, to a sender of the communication to the first user, the determined first time range; and
    providing a user interface to the sender to validate the sending of the communication to the first user.

8. The computer-implemented method as recited in claim 1, further comprising:
    determining, by a frequency model, a frequency of communications to be sent to the first user; and
    determining a communication strategy for the first user based on the first time range determined by the send-time model and on the frequency of communications determined by the frequency model.

9. The computer-implemented method as recited in claim 1, further comprising:
    determining, by a channel model, a best channel for sending communications to the first user; and
    determining a communication strategy for the first user based on the first time range determined by the send-time model and on the best channel determined by the channel model.

10. The computer-implemented method as recited in claim 1, wherein the communication is at least one of an email message or a Short Message Service (SMS) message.

11. A system comprising:
    a memory comprising instructions; and
    one or more computer processors, wherein the instructions, when executed by the one or more computer processors, cause the system to perform operations comprising:
    training a machine-learning program to generate a send-time model, the training utilizing training data defined by features related to information about users and responses of the users to previous communications to the users, the generated send-time model being configured to determine a time range for sending communications to users;
    receiving a communication request to send a communication to a first user;
    determining, by the send-time model and based on first information about the first user, a first time range for sending the communication to the first user, the determined first time range beginning with a begin time and ending with an end time; and
    causing the communication to be sent to the first user within the determined first time range by increasing a priority of the communication from a relatively lower priority of the communication at the begin time of the determined first time range to a relatively higher priority of the communication prior to the end time of the determined first time range.

12. The system as recited in claim 11, wherein the features of the training data include at least one of email data, text of email body, text of email subject, recipient Internet Protocol (IP) addresses; flags indicating if recipients read the previous communications, flags indicating if recipients selected a link in the previous communications, flags indicating if recipients unsubscribed to messages from a sender in response to the previous communications, or times when recipients engaged with the previous communications.

13. The system as recited in claim 11, wherein the operations further comprise:
   before the training, collecting the information about the users and the responses of the users to the previous communications; and
   embedding the collected information into vectors to generate the training data for the machine-learning program.

14. The system as recited in claim 11, wherein the responses of the users to the previous communications include an indication of whether the users read the previous communications and an indication of whether the users selected a link in the previous communications.

15. The system as recited in claim 11, wherein the determined first time range for sending the communication is defined by at least one of a range of times, a day of the week, a weekday, and a weekend.

16. A non-transitory machine-readable storage medium including instructions that, when executed by a machine, cause the machine to perform operations comprising:
   training a machine-learning program to generate a send-time model, the training utilizing training data defined by features related to information about users and responses of the users to previous communications to the users, the generated send-time model being configured to determine a time range for sending communications to users;
   receiving a communication request to send a communication to a first user;
   determining, by the send-time model and based on first information about the first user, a first time range for sending the communication to the first user, the determined first time range beginning with a begin time and ending with an end time; and
   causing the communication to be sent to the first user within the determined first time range by increasing a priority of the communication from a relatively lower priority of the communication at the begin time of the determined first time range to a relatively higher priority of the communication prior to the end time of the determined first time range.

17. The non-transitory machine-readable storage medium as recited in claim 16, wherein the features of the training data include at least one of email data, text of email body, text of email subject, recipient Internet Protocol (IP) addresses, flags indicating if recipients read the previous communications, flags indicating if recipients selected a link in the previous communications, flags indicating if recipients unsubscribed to messages from a sender in response to the previous communications, or times when recipients engaged with the previous communications.

18. The non-transitory machine-readable storage medium as recited in claim 16, wherein the operations further comprise:
   before the training, collecting the information about the users and the responses of the users to the previous communications; and
   embedding the collected information into vectors to generate the training data for the machine-learning program.

19. The non-transitory machine-readable storage medium as recited in claim 16, wherein the responses of the users to the previous communications include an indication of whether the users read the previous communications and an indication of whether the users selected a link in the previous communications.

20. The non-transitory machine-readable storage medium as recited in claim 16, wherein the determined first time range for sending the communication is defined by at least one of a range of times, a day of the week, a weekday, and a weekend.

* * * * *

UNITED STATES PATENT AND TRADEMARK OFFICE
CERTIFICATE OF CORRECTION

| | |
|---|---|
| PATENT NO. | : 11,625,751 B2 |
| APPLICATION NO. | : 16/999810 |
| DATED | : April 11, 2023 |
| INVENTOR(S) | : Longo et al. |

It is certified that error appears in the above-identified patent and that said Letters Patent is hereby corrected as shown below:

In the Claims

In Column 22, Line 67, in Claim 12, delete "addresses;" and insert --addresses,-- therefor Signed and Sealed this
Thirtieth Day of July, 2024

Katherine Kelly Vidal
*Director of the United States Patent and Trademark Office*